Jan. 5, 1965  F. A. MORRIS ETAL  3,164,677
TOLL CHARGE COMPUTER
Original Filed Feb. 11, 1957  10 Sheets-Sheet 1

INVENTORS
FRANK A. MORRIS
JAMES D. CONFELD
HOWARD L. FOOTE
BY

ATTORNEY

Elapsed Time Counter-600

Elapsed Time Counter-600

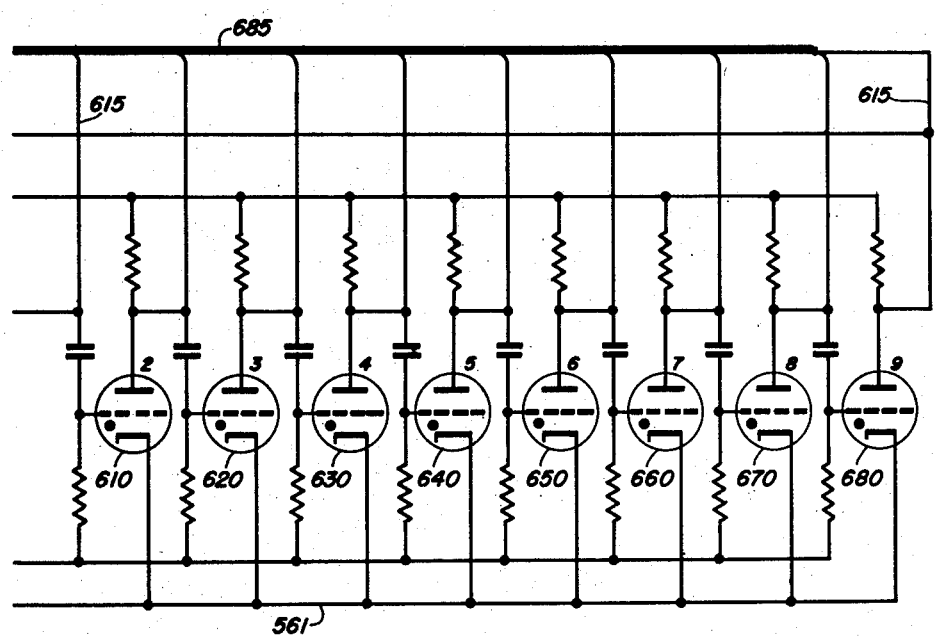
Elapsed Time Counter-600
UNITS MINUTES COUNTING RING-500
FIG. 6
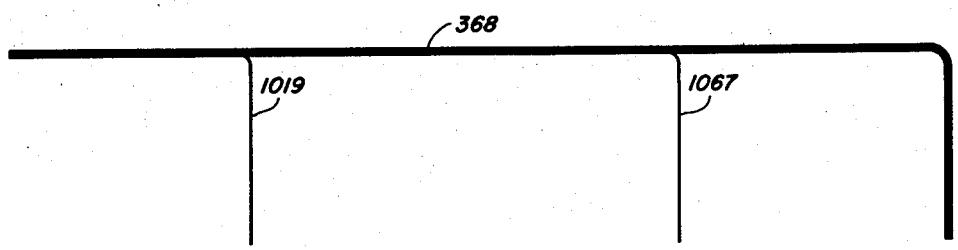

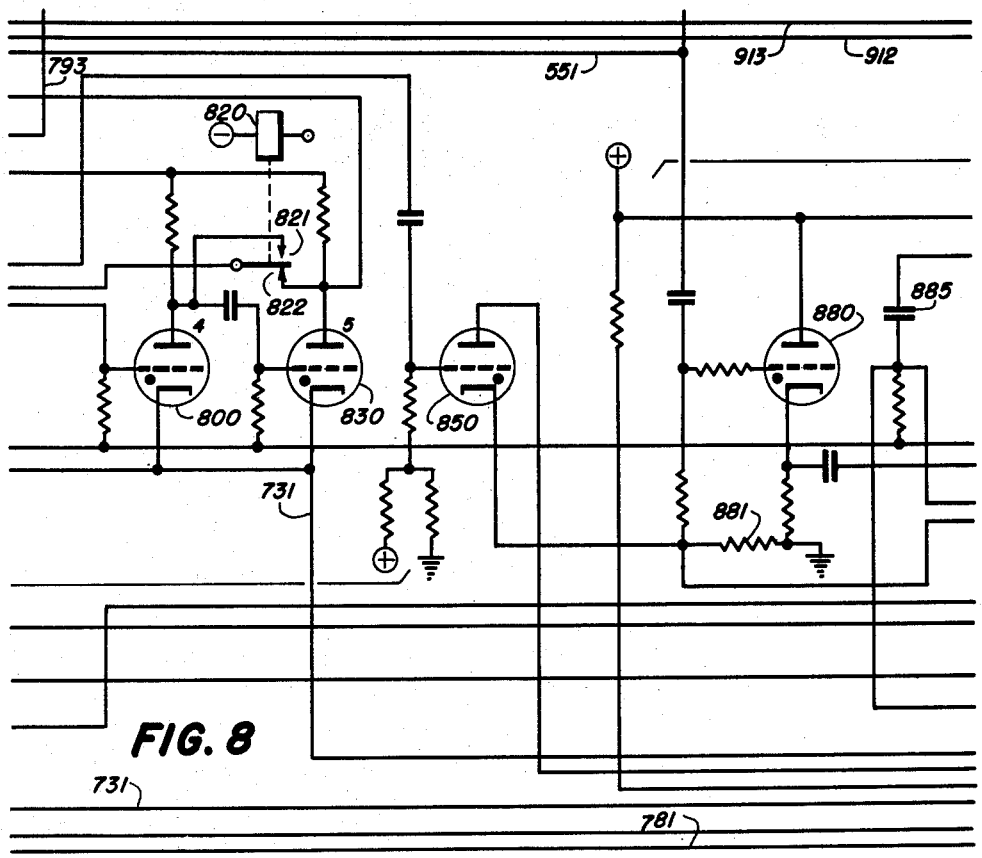
FIG. 8
Cost Computer - 239
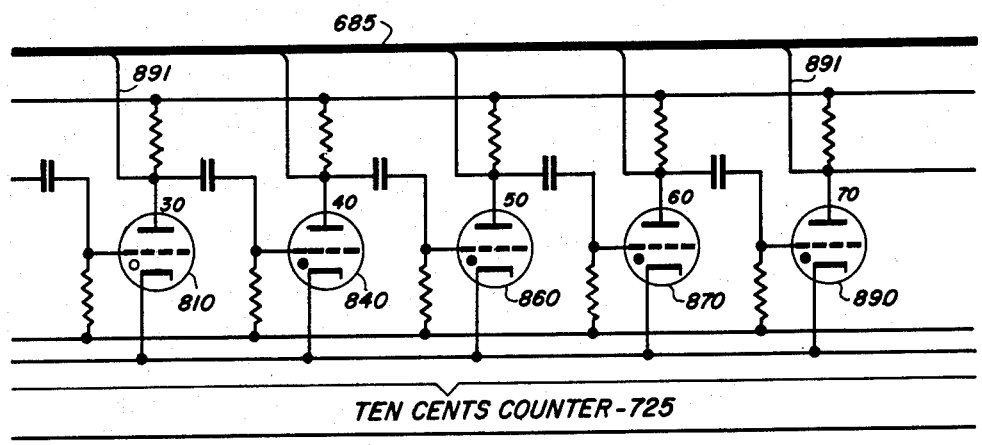
TEN CENTS COUNTER - 725

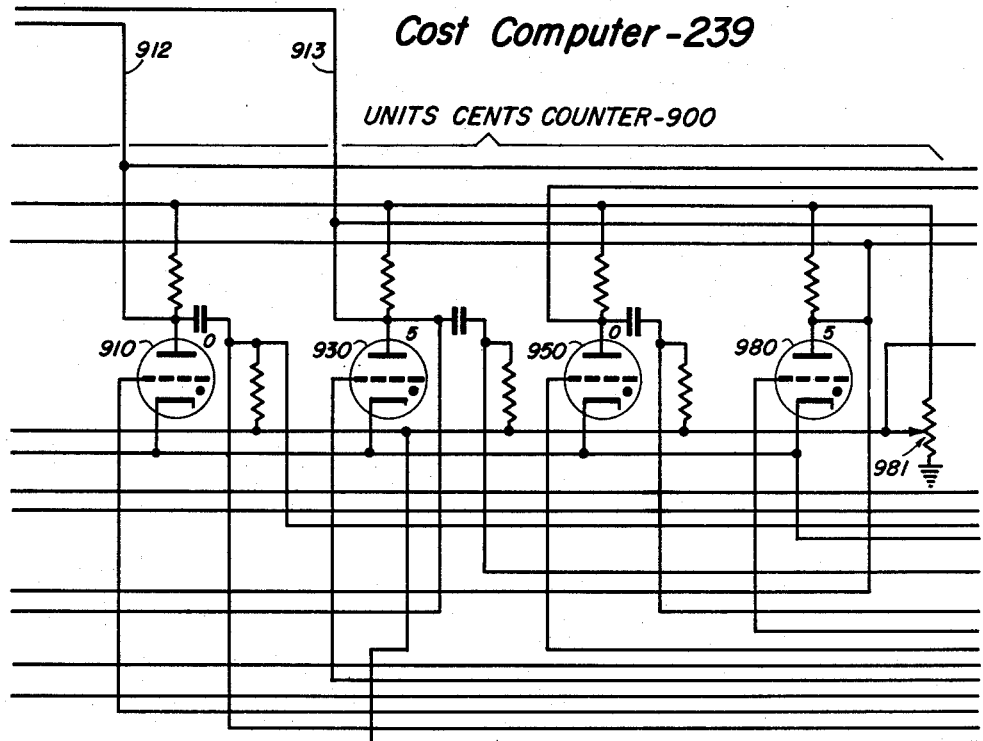
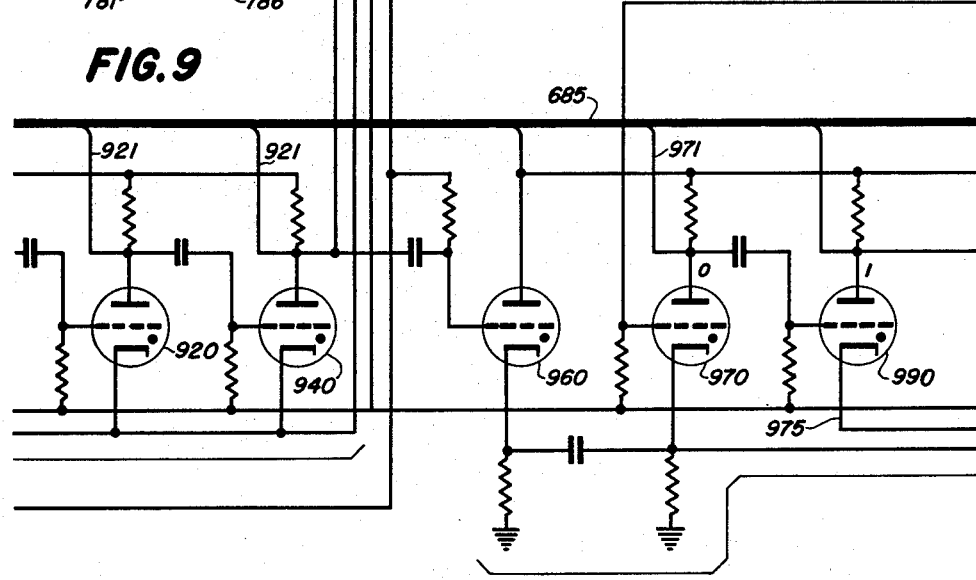

Jan. 5, 1965  F. A. MORRIS ETAL  3,164,677
TOLL CHARGE COMPUTER
Original Filed Feb. 11, 1957  10 Sheets-Sheet 10
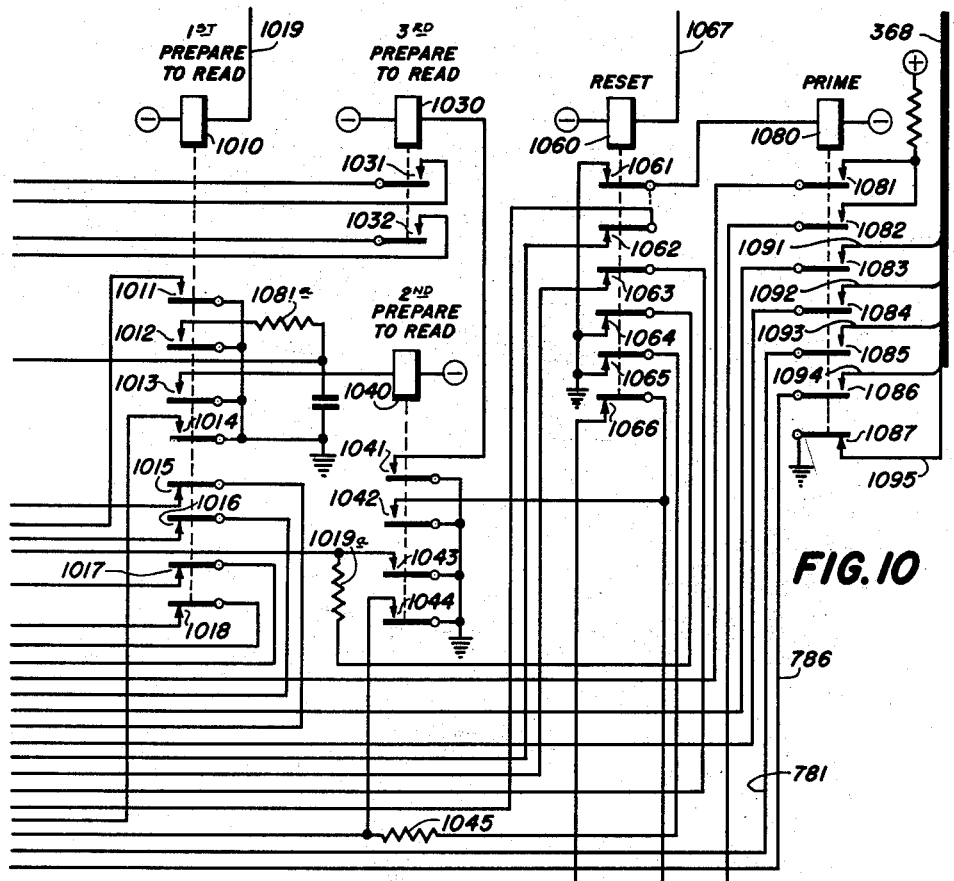
FIG. 10
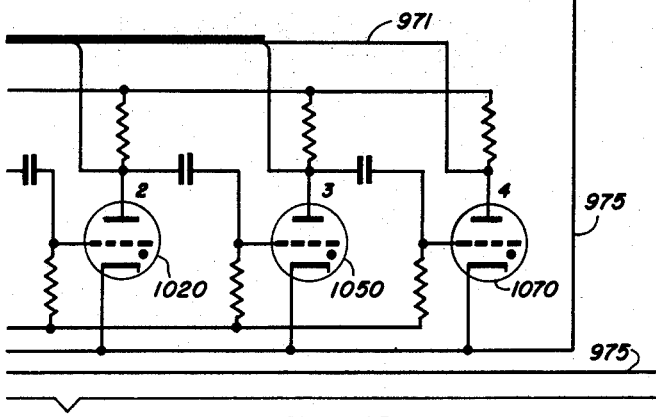
Cost Computer-239
UNITS DOLLARS COUNTER-905
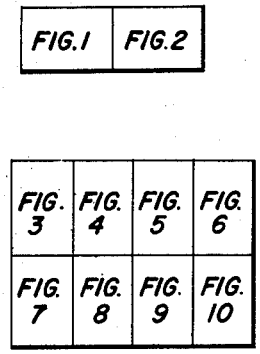
FIG. 12
| FIG.1 | FIG.2 |
| FIG. 3 | FIG. 4 | FIG. 5 | FIG. 6 |
| FIG. 7 | FIG. 8 | FIG. 9 | FIG. 10 |
FIG. 11

United States Patent Office 3,164,677
Patented Jan. 5, 1965

3,164,677
TOLL CHARGE COMPUTER
Frank A. Morris, Fishers, James D. Confeld, Rochester, and Howard L. Foote, Fairport, N.Y., assignors to General Dynamics Corporation, Rochester, N.Y., a corporation of Delaware
Application Feb. 11, 1957, Ser. No. 639,447, which is a division of application Ser. No. 348,202, Apr. 13, 1953, now Patent No. 2,886,642. Divided and this application Oct. 12, 1959, Ser. No. 845,912
7 Claims. (Cl. 179—7.1)

This invention relates to a computing means and, more particularly, to computing means for establishing the charges to be assessed for telephone calls. The present application is a division of a copending application of Frank A. Morris et al., Serial No. 639,447, filed February 11, 1957, and this prior application is, in turn, a division of an earlier copending application of Frank A. Morris et al., Serial No. 348,202, filed April 13, 1953, now United States Patent No. 2,886,642.

To provide a means for reducing the cost of handling short and long haul toll calls, these calls are established automatically under the control of subscriber dialed information in automatic toll ticketing systems without requiring the intervention of an operator. These toll ticketing systems, in addition to including switching equipment for selectively establishing connections under the control of dialed signals, include data storing means for automatically collecting and storing the data pertaining to a toll call, such as the date and time at which the call is placed, the length of the call, the identifications of the parties involved, and the duration of the call. This stored data is then utilized to control the production of permanent records each pertaining to a single call or to the calls placed by a particular subscriber. The data provided on the permanent record, in addition to all or part of the data described above, generally includes a monetary charge which is to be assessed for the toll call. This monetary charge is based on the duration of the call and on the applicable rate structure which is dependent upon the areas between which each connection is extended. The rate structure generally comprises a base time interval for which an initial charge is assessed and an overtime period for each of which an additional increment of cost is added to the initial charge. This monetary charge is established by a cost computing or calculating means which is associated with the means for producing the permanent record and which is supplied with all or part of the necessary duration and rate information from the data storing means.

Accordingly, one object of the present invention is to provide a telephone system including new and improved means for establishing charges to be assessed for telephone calls.

Another object is to provide a telephone system in which duration data is stored in the form of a group of pulses which are subsequently supplied to control the operation of a cost or charge computing means.

Another object is the provision of a telephone system having cost computing means supplied with rate information independently of the data collected in conjunction with toll calls.

A still further object is the provision of a telephone system having a plurality of registers, each storing data pertaining to telephone calls, which are successively rendered effective to control the operation of a common means for establishing charges to be assessed for the calls.

Another object is to provide a telephone system having computing means which are rendered effective at selected chronological intervals to establish charges for toll calls.

A still further object involves the provision of a telephone system in which the duration of the telephone call and the charge to be assessed therefor are simultaneously established.

Another object is to provide electronic means for establishing charges to be assessed for telephone calls.

Another object is to provide a cost computer or calculator including serially related counting circuits operable in accordance with rate and duration information to establish charges to be assessed for toll calls.

Another object is to provide a cost computer including serially related counting circuits operated by stored duration pulses each representing a fixed time increment.

A still further object is the provision of a calculator which is primed with an initial charge representing a base time period and which adds monetary increments to the initial charge in accordance with the duration of a toll call beyond the base time interval.

In accordance with these and many other objects, in a system of the type disclosed in the above identified copending Morris et al. application, each of a plurality of outgoing trunk circuits to different areas or exchanges is individually provided with a trunk recorder on which a pulse is magnetically recorded by timing means at the end of each minute of the duration of a toll call. Each of the trunk recorders is capable of storing the items of information pertaining to a plurality of separate toll calls including the duration data pertaining to each of these calls. At a selected time, such as the early hours of the morning in which the traffic on the system is at a relatively low level, time controlled means place a playback control circuit in operation so that switching means associated therewith sequentially seize and connect each of the individual trunk recorders to a playback or recording facility including a recorder and a cost computer. Following the seizure of a selected trunk recorder, the magnetic tape therein is advanced to transmit all of the items of information pertaining to the first call recorder thereon to register circuits which are associated with the recorder, thereby to condition these registers for subsequently controlling the operation of the recorder to provide a permanent record of all of the items of information pertaining to the toll call such as the date and time of placing the call, the identifications of the parties involved in the call, the duration of the call, and the charge to be assessed for the call. The charge to be assessed for the call is established by the cost computer or calculating means.

The cost computer or calculator comprises a plurality of serially related counting circuits comprising a base time counter, a five cents counting ring, a tens cents counting ring, and a dollars counting chain which are sequentially operated step-by-step under the control of duration signals supplied thereto from the trunk recorder. The step-by-step mode of operation of at least some of these counting rings or chains is selectively modified in accordance with the rate structure which is to be utilized in establishing the monetary charges. Since each of the trunk recorders stores the items of information pertaining to calls extended between two fixed and predetermined areas, the selection of a particular trunk recorder determines the rate structure which is to be utilized in establishing the monetary charges for the calls extended between these two areas. Accordingly, the cost computer is selectively provided with rate information under the control of the switching means utilized to seize the trunk recorder. This rate structure comprises a base time interval for which an initial charge is assessed and includes overtime information relating to the length of the overtime interval for each of which an increment of cost is to be added to the initial charge. Accordingly, the rate structure means associated with the cost computer includes means for conditioning the base time counter for subtracting a predetermined time period from the total duration data to determine an overtime interval, and the rate structure means also primes the counting rings and chains to manifestations representing the initial charge which is to be assessed for this base time period.

Following the priming of this rate information into the cost computer, the magnetic tape in the trunk recorder is advanced so that the group of one minute duration pulses is transmitted to the cost computer and, in parallel therewith, to an elapsed time counter including a units minutes counting ring and a tens minutes counting chain. These pulses advance the elapsed time counter to manifestation representing the total number of pulses received from the trunk recorder to establish the length of the toll call. The elapsed time pulses applied to the cost computer first operate the base time counter so that a selected number thereof are rendered ineffective to advance the cents and dollars counting circuits, thereby effectively subtracting the base time interval from the duration data. After a number of signals or pulses representing the length of the base time interval have been received, the base time counter renders the five cents counting ring responsive to the remainder of the group of duration signals so that the five cents counting ring, the tens cents counting ring, and the dollars counting chain are advanced step-by-step in accordance with the remaining signals or pulses transmitted from the trunk recorder, thereby to advance the original manifestation representing the initial charge to a manifestation representing the total charge, which total charge comprises the sum of the initial charge and the charge increments which have been added for the overtime intervals.

Following the completion of the establishment of the charge to be assessed for the toll call, a switching means in a recording control circuit is rendered effective to sequentially connect the counting chains and rings in the elapsed time counter and the cost computer to the recorder so that a permanent record of the duration of the call and the monetary charge to be assessed therefor are provided. Following the completion of the recording of this information, the elapsed time counter and the cost computer are cleared, and the data pertaining to the next toll call recorded on the seized trunk recorder is transmitted, thereby to establish the duration of this call and the charge to be assessed therefor.

Following the completion of the transmission of all of the information stored in the first trunk recorder, the playback control circuit is operated to advance the switching means associated therewith to seize the next trunk recorder. Incident to seizing this next trunk recorder, the cost computer is again provided with a rate structure which is applicable to the areas between which the calls are extended whose data is stored in this next seized trunk recorder. In a similar manner, the items of information pertaining to the toll calls stored on all of the trunk recorders to which the switching means in the playback control circuit has access are played back to provide printed or perforated records including the durations of the calls and the charges to be assessed therefor.

Other objects and advantages of the present invention will become apparent from the ensuing description of an illustrative embodiment thereof in the course of which reference is made to the accompanying drawings in which.

Figure 1:
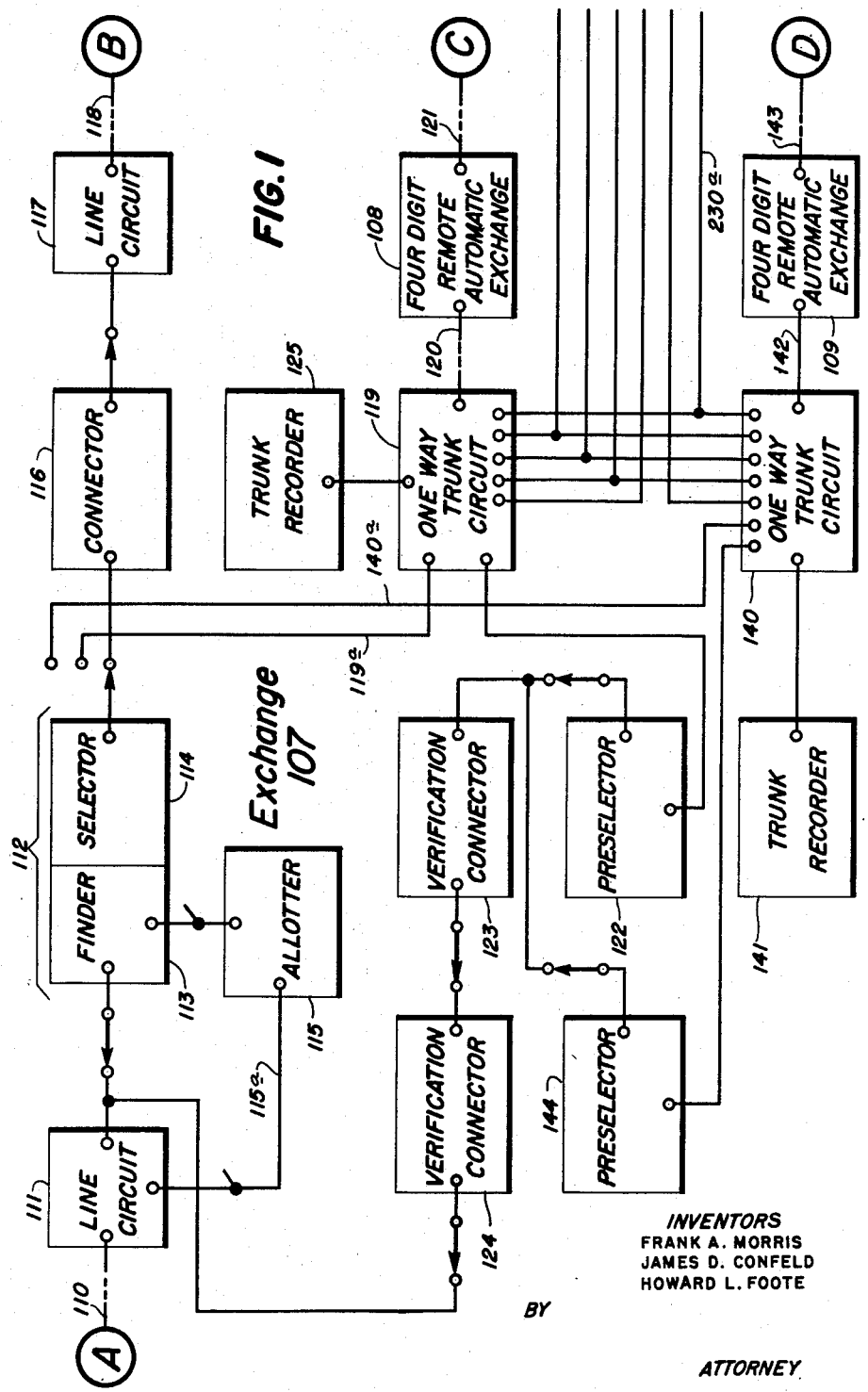
FIGS. 1 and 2 are a one-wire block diagram of an automatic toll ticketing system embodying the present invention which is shown in conjunction with a conventional automatic telephone system.
Figure 2:
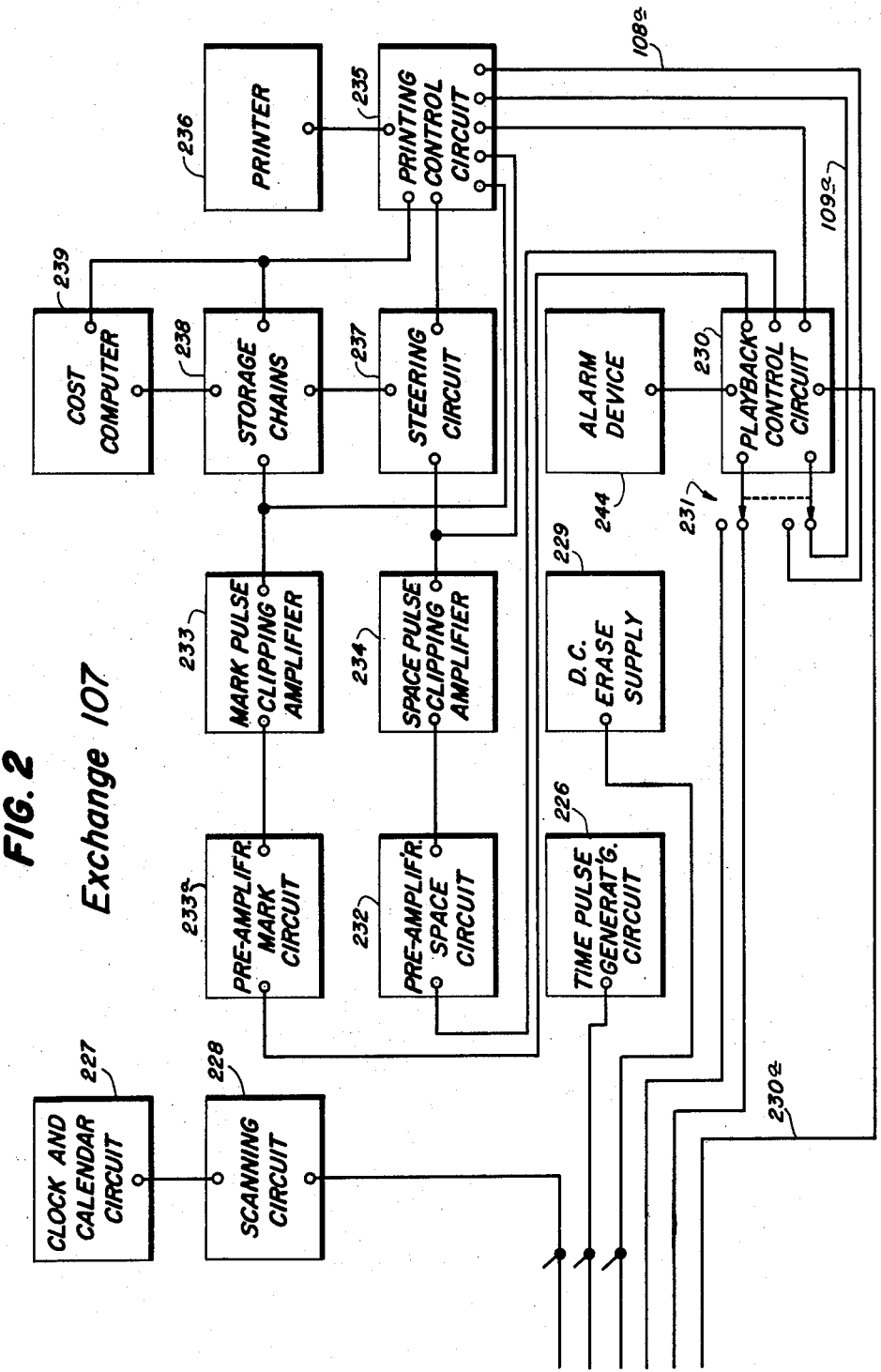
Figure 4:
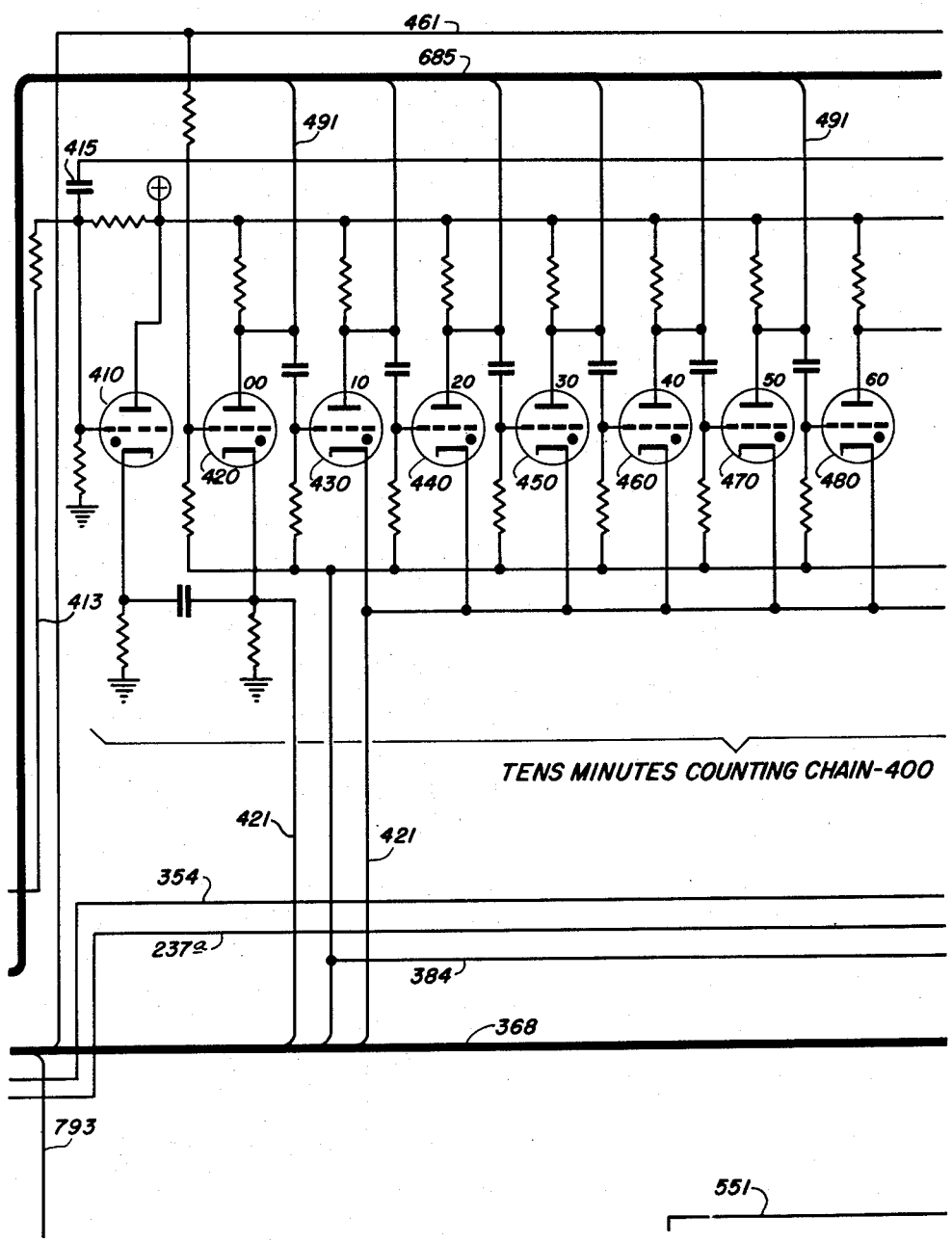
Figure 5:
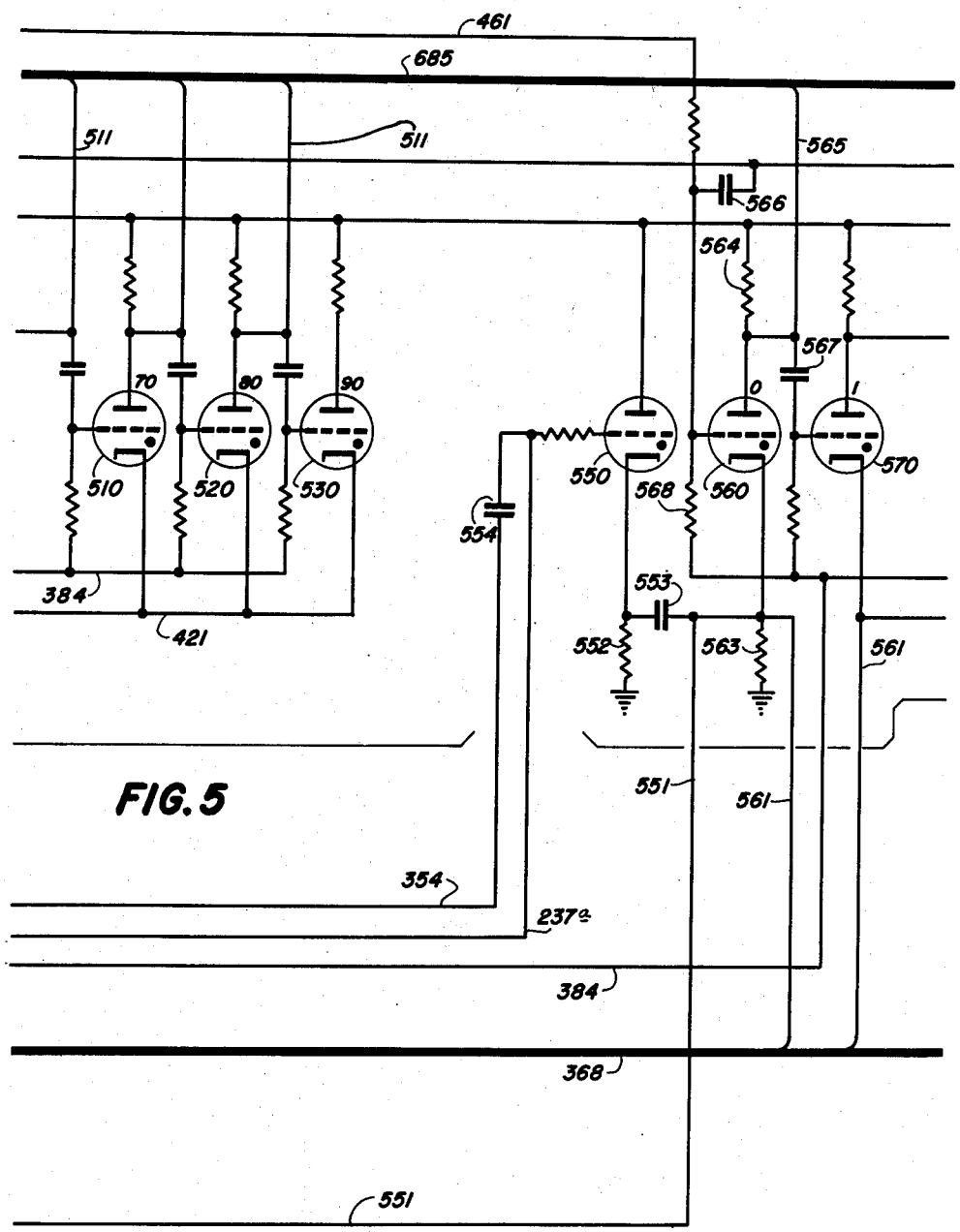

FIGS. 4-6 form a schematic diagram of an elapsed time counter associated with the cost computer;

FIGS. 7-10 form a schematic diagram of the cost computer;

FIG. 11 is a block diagram illustrating the manner in which FIGS. 3-10 are positioned adjacent each other to form a schematic diagram of the automatic toll ticketing system including the elapsed time counter and the cost computer; and FIG. 12 is a block diagram illustrating the manner in which FIGS. 1 and 2 are positioned adjacent each other to form a complete block diagram of the system.

Referring now to FIGS. 1 and 2 of the drawings, therein is illustrated a block diagram of an automatic toll ticketing system of which the computing means of the present invention forms a part and which is of the type shown and described in detail in the above identified Morris et al. patent. This system includes a substation A located in a local exchange 107, an additional substation B which is located in the exchange 107, and a plurality of remote substations C and D which are located in areas geographically remote from the exchange 107 and to which toll calls requiring the automatic collection and storage of information can be extended.

In extending a local call for which toll data is not to be collected, going off-hook at the calling substation A completes the calling loop circuit over a line 110 to a line circuit 111, the operation of which places an allotter 115 in operation by supplying start ground to a common start conductor 115a. The allotter 115 searches for an idle link, such as a link 112 including a finder 113 and a selector 114, and operates the finder 113 in the link 112 to search for and seize the line circuit 111, thereby extending the calling loop circuit to the selector 114.

In response to the receipt of dial tone, the subscriber at the substation A dials the digits forming the designation of the local substation B so that the selector 114 and a connector 116 respond to these signals to extend a connection to a line circuit 117 which is connected to the called substation B over a line 118. In response to the receipt of answering supervisory signals, the calling loop circuit is cut through between the substations A and B to permit conversation. When the connection is released, the connector 116 and the link 112 are released to permit their subsequent use in extending telephone connections.

When a call is to be extended from the local substation A to a remote substation C, which may comprise a short or long haul toll call, the call is initiated by going off-hook at the calling substation A to place the allotter 115 in operation, as described above, so that an idle link, such as the link 112, is associated with the line circuit 111 and the selector 114 therein is conditioned to receive dial impulses. In order to seize the automatic data collecting and storing equipment forming a part of the automatic toll ticketing system, the first digit dialed at the substation A in extending the toll call is an access digit which varies in accordance with the remote area in which the called substation A is located. In response to receiving the dialed access digit, the selector 114 advances its wipers to the proper level and searches over the contact multiples in the selected level to seize an idle trunk circuit extending to the desired remote area. Assuming that the call is to be extended to the substation C, an idle one-way trunk circuit 119 is seized over a conductor 119a to prepare this circuit for repeating switch directing signals over a conductor 120 to a four-digit remote automatic exchange 108 to which the substation C is connected by a conductor 121. Incident to seizure, the one-way trunk circuit 119 prepares circuits for recording data pertaining to the toll call in a trunk recorder 125 which is individual to the trunk circuit 119.

Alternatively, if the call is to be extended to the substation D in a different geographic area, a different access digit is dialed at the substation A so that a one-way trunk circuit 140 connected to a four-digit remote exchange 109 over a conductor 142 is seized, the substation D being connected to the exchange 109 by a conductor 143. Incident to seizure of the one-way trunk circuit 140, one group of circuits is prepared therein for repeating switch directing signals to the exchange 109 and additional circuits are prepared for collecting and storing data pertaining to the toll call in a trunk recorder 141 which is individually connected to the trunk circuit 140.

One of the items of information which is collected and stored in conjunction with each toll call is the identification of the calling substation A. In the automatic toll ticketing system shown and described in detail in the above identified Morris et al. patent, calling party or line identification is provided by a vertification technique in which the calling subscriber at the station A dials his own directory number immediately following the dialing of the access digit. In other words, subscribers served by the exchange 107 are instructed that before they can use the toll trunking facilities to establish connections to the desired substations C and D served by the remote exchanges 108 and 109, they must dial their own directory numbers before dialing the directory numbers assigned to the desired called substations. In the present case, the calling subscriber at the substation A, after dialing the trunk selection or access digit, dials his own directory number into the trunk circuit 119. This trunk circuit repeats the impulses of each digit to the trunk recorder 125 and also repeats the impulses of each digit through a preselector 122 to verification switching equipment. More specificall,y, each impulse of each digit is discretely recorded as a mark pulse on a magnetic tape in the recorder 125. At the end of each digit, the trunk circuit 119 functions to transmit a space signal to the trunk recorder 125 which is likewise recorded on the recorder tape to indicate the end of the digit. Thus, groups of recorded mark pulses representing successive digits are separated on the tape by the space pulses recorded therebetween.

Incident to seizure of the one-way trunk circuit 119 by the selector 114, the preselector 122 functions automatically to associate the trunk circuit with an idle one of a plurality of verification selectors. Assuming that a verification selector 123 is seized by the preselector 122 incident to seizure of the trunk circuit 119, the first digit of the directory number assigned to the calling line 110, as repeated to the verification selector 123 through the preselector 122 from the trunk circuit 119, is utilized to move the wipers of this selector opposite the level of bank contacts in which are terminated the seizure trunks extending to the verification connectors of the group having access to the line circuit multiples terminating the lines of the one hundred line group which includes the calling line 110. A preselector 144 performs the same functions as the preselector 122 for calls placed through the trunk circuit 140. During the interdigit pause between this digit and the second digit of the calling subscriber's directory number, the selector 123 automatically and successively tests the switch trunks extending to the connectors until an idle connector is found. Assuming that a connector 124 is selected during this trunk hunting operation of the selector 123, the pulse repeating loop circuit from the trunk circuit 119 is switched through to the connector 124 by the selector 123 immediately after the wipers of this selector are positioned on the contacts terminating the seizure trunk of this connector. The verification connector 124 responds to the second and third digits of the directory number assigned to the calling line 110 by successively selecting the subgroup of ten lines including the calling line and then the particular calling line itself. All that the verification connector is called upon to do is to establish a through connection between the sleeve lead path through the switches 123 and 124 and the sleeve lead path through the switches 113 and 114. In other words, a sleeve loop is established which extends from the trunk circuit 119 through the preselector 122, the verification selector 123, the verification connector 124, the line circuit multiple of the line 110, the finder 113, the selector 114, and the sleeve lead of the trunk 119a back to the trunk circuit 119. If this path is successfully completed, the one-way trunk circuit 119 recognizes that the calling subscriber has properly identified the line 110 as the calling line. On the other hand, if this sleeve loop is not completed, the trunk circuit 119 is informed that the calling line has not been properly identified.

At this point it may be noted that one of the features of the verification train is the provision of facilities in the connector 124 (and in the other similar connectors) for answering back to the trunk circuit 119 to provide an indication that the required number of digits has been dialed into the connector to set the wiper of this connector on the outlet contact individual to the subscriber line designated by the directory number which has been dialed into the trunk circuit. Thus, the trunk circuit 119 is informed by the connector 124 as to when the line identification test should be started. The verification train is dismissed immediately after the calling line verification test is completed regardless of whether this test is successful or not. Specifically, the trunk circuit 119, upon completing the verification test, removes holding ground from the sleeve lead extending to the selector 123, with the result that this selector and connector 124 are released. Thus, these switches are made available for use by the other trunk circuits.

Assuming that the above described calling line verification test is not successful, the trunk circuit 119 refuses to establish a dial impulse repeating loop by way of the interoffice trunk 120 to the switching equipment in the remote exchange 108. Under such circumstances, the one-way trunk circuit 119 transmits a signal back over the calling loop circuit to indicate to the calling subscriber at the substation A that the call cannot be completed. It will thus be understood that unless the calling subscriber after dialing the single digit designating the group of trunks extending to the desired remote exchange correctly dials his own directory number, the trunk circuit 119 will not permit the connection to be extended to the called substation. The calling subscriber, upon receiving the described signal, is expected to release the connection. When this occurs, the line circuit 111 and link 112 are, of course, released. Also, in response to the on-hook signal received from the calling substation, the trunk circuit transmits an end-of-call signal, i.e. coincident mark and space pulses to the trunk recorder 125. Recording of these pulses without recording the other information which is always recorded incident to the successful completion of a call establishes that the call under consideration was unsuccessful so that it is disregarded during the playback operation described below. In other words, the information recorded by the trunk recorder 125, being incomplete, is recognized as such by the playback facilities and is disregarded by these facilities so that no ticket is printed for the call. After the end-of-call signal is transmitted to the recorder, the trunk circuit transmits several advance pulses to the recorder to advance the tape thereof in preparation for the recording of data pertaining to the next call handled by the trunk circuit 119. Following transmission of the advance pulses, the trunk circuit 119 is released.

Assuming now that the calling line verification test is successfully completed in the manner explained above, the trunk circuit 119 is automatically conditioned to repeat dial impulses by way of the trunk 120 to the automatic switching equipment in the remote exchange 108. The impulses of these digits are repeated by the trunk circuit 119 over the trunk 120 to the switching equipment in the exchange 108 with the result that this equipment functions to select the called line 21. These digits are also recorded in the trunk recorder 125 following the digits representing the directory number assigned to the calling line. Thus, after the dialing operation is completed at the calling substation, full information on the identity of the calling and called lines is recorded in the trunk recorder 125.

Following the described operations, nothing further occurs in the trunk circuit 119 until the call is answered at the called substation C. In response to the call answering operation at the substation C, the trunk circuit 119 functions to associate the time pulse generating circuit 126 with the recorder 125 so that pulses equal in number to elapsed minutes are fed to the recorder 125 and recorded in the mark position along the tape of this recorder for the duration of the call. When the called subscriber at the substation C hangs up to conclude the call, nothing occurs except that the trunk circuit 119 functions to interrupt the transmission of time pulses from the time pulse generating circuit 126 to the trunk recorder 125, thereby to terminate the call timing operation.

When the calling subscriber hangs up, the trunk circuit 119 opens the loop extending by way of the trunk 120 to the remote exchanger 108, with the result that the switching equipment in the exchange 108 occupied with the call is released. Coincident with this operation, the trunk circuit 119 removes holding ground from the sleeve lead of the trunk 119a for an interval long enough to effect release of the line circuit 111, the finder 113, and the selector 114, and then restores ground to this lead to guard the trunk circuit against seizure on another call before it has completed its recording operation. Substantially coincident with release of the line circuit 111 and the link 112, the trunk circuit 119 transmits a space pulse to the recorder 125 to mark the end of the elapsed time measuring operation, and then operatively associates a scanning circuit 228 with the trunk recorder 125. As a consequence, the scanning circuit 228, as controlled by the setting of a clock and calendar circuit 227, feeds pulses to the recorder 125 in decimal digit form which identify in succession the month, day, hour, and minute the call is terminated. The pulses making up the digits representing this information are recorded as mark pulses on the record tape of the recorder 125, and each digit is marked off from its succeeding digit by the transmission of a space pulse to the trunk recorder from the trunk circuit 119 during the intervals separating the digits.

After a full complement of time and data digits have been transmitted from the scanning circuit 228 to the trunk recorder 125 by way of the trunk circuit 119, the trunk circuit automatically records an end-of-call signal on the tape of the recorder. As explained above, this end-of-call signal is in the form of coincident mark and space pulses recorded along opposite edges of the recording tape. After the end-of-call signal is recorded on the record tape of the recorder 125, the trunk circuit 119 automatically transmits five or six tape advance pulses to the recorder so that the record tape is advanced an interval to space the coded information on the call just considered from the information recorded on the tape incident to the handling of a succeeding call by the trunk circuit 119. After the described tape advance operation is completed, the trunk circuit 119 removes guarding ground potential from the sleeve lead of the trunk 119a to render the trunk circuit accessible for use on other calls and otherwise restores itself to normal.

As will be understood from the above explanation, if the called line 121 served by the remote exchange 108 is busy at the time the described call is routed thereto or if the substation C is unattended so that the call is not answered, duration pulses and the described time and date digits are not recorded on the record tape of the recorder 125. However, the end-of-call signal is recorded and the record tape is spaced following abandonment of the call at the calling substation in the same manner as in the case of a successfully completed call. Absence of the date, time, and elapsed time of call information from the record thus formed on the tape of the recorder 125 is recognized by the playback facilities which respond to this absence by refusing to print a ticket for the call.

The manner in which additional calls are handled by the trunk circuit 119 and information concerning these calls is recorded by the trunk recorder 125 is exactly the same as explained above. Moreover, the other trunk circuits provided in the system and their respective associated trunk recorders operate in identical fashion to record information on calls to the remote exchanges 108 and 109 handled by these trunk circuits. It will be understood, therefore, that each trunk recorder may have recorded therein information on a large number of toll calls at the time the associated trunk circuit becomes operatively associated with the playback facilities under the control of a playback control circuit 230.

Under normal circumstances, the playback and ticket printing facilities are only rendered operative to convert the information stored in the trunk recorders into printed tickets on a periodic basis, say once during each twenty-four hour period. While these facilities are normally active, the plyback control circuit 230 functions sequentially to associate the trunk circuits with the translating and printing facilities. Referring now more particularly to the manner in which the playback operation is performed, it is pointed out that when the wipers of a sequence switch 231 in the playback control 230 are positioned on the contacts terminating the conductors extending to the trunk circuit 119, a busy test is first performed in the playback control circuit to determine whether or not the trunk circuit 119 is engaged with a call. If this trunk circuit is occupied with a call, it tests busy to the playback control circuit 230 so that the sequence switch 231 of this control circuit is automatically advanced to the position corresponding to the next trunk circuit. Assuming that the trunk circuit 119 is idle at the time it is thus tested by the playback control circuit 230, the playback control circuit seizes the trunk circuit and thus operatively associates the trunk circuit with the translating and printing facilities. Incident to such seizure, guarding ground potential is applied to the sleeve lead of the trunk 119a in the circuit 230, thereby to guard the trunk circuit against seizure through the finder-selector links of the exchange 107. Coincident with this operation, separate pulse signal transmission paths are established through the trunk circuit 119 and the playback control circuit 230 between the mark and space heads of the trunk recorder 125 and the input terminals of two preamplifier circuits 233a and 232. At the same time, a clutch drive magnet in the recorder 125 is energized through the trunk circuit 119 from the playback control circuit 230, thereby to establish a driving connection through which the record tape of the recorder 125 is driven forwardly back to its normal or start position. When the clutch magnet of the recorder 125 is energized in the manner indicated above, the tape of this recorder is driven in the forward direction by the playback drive facilities. In this connection, the tape driving facilities include a common drive shaft and a common motor which are employed to drive the record tape of the trunk recorder during the playback operation thereof.

When the playback control circuit 230 seizes the trunk circuit 119 in the manner just explained, it also places marking ground potential upon a destination lead 108a extending to a printing control circuit 235. This destination lead is provided to indicate operative association of the playback control circuit 230 with trunk circuits terminating those trunks which extend from the exchange 107 to the exchange 108. To this end, the destination lead 108a is multiplied to those contacts of the sequence switch in the playback control circuit 230 which are engageable by the destination wiper of this sequence switch and correspond to trunk circuits terminating trunks extending from the exchange 107 to the exchange 108. In similar manner, a destination lead 109a is provided to indicate operative association of the playback facilities with trunk circuits terminating trunks extending from the exchange 107 to the exchange 109. Thus the destination lead 109a is multipled to the contacts of the sequence switch in the playback control circuit 230 which are engageable by the destination wiper of this switch and correspond to trunk circuits terminating trunks extending from the exchange 107 to the exchange 109.

When the destination lead 108a is grounded in the playback control circuit 230 in the manner just explained, the printing control circuit 235 and a cost computer 239 are advised that the playback facilities are operatively associated with a trunk circuit terminating a trunk extending from the exchange 107 to the exchange 108. Coincident with grounding of the identified desstination lead, the playback control circuit functions to reset all of a plurality of storage chains 238 to normal. The purpose of effecting a chain resetting operation at this time is that of clearing the chains of any false registrations which may have been spuriously accumulated therein as a consequence of pulses developed at the output terminals of two amplifiers 233 and 234 incident to the switching of the input terminals of the amplifier circuits 233a and 232 from trunk circuit to trunk circuit by the sequence switch of the playback control circuit 230.

When the record tape in the recorder 125 is driven back to its start position, contacts are closed in the recorder 125 to advise the trunk circuit 119 and the playback control circuit 230 that the recorder 125 is now ready to release the information stored therein to the translating facilities. More specifically, when the indicated trunk recorder contacts are closed, a circuit is established for exciting an erase head in the recorder 125 from an erase supply source 229. Also incident to the closure of the identified contacts in the trunk recorder 125, the control circuit 230 transfers control of the drive clutch magnet in the recorder 125 from itself to the printing control circuit 235. After these operations are completed, the equipment is fully conditioned to transfer the information stored or recorded on the record tape of the recorder 125 from this recorder to the storage chains 238.

The information recorded on the record tape of the recorder 125 is released to the playback facilities on a call-by-call basis. In this regard, it will be recalled that the first record of a successfully completed call handled by the trunk circuit 119 which is recorded on the record tape of the recorder 125 comprises four successive digits, each containing from one to ten pulses, representing the directory number of the calling subscriber line 110, four successive digits representing the directory number of the called subscriber, a series of duration pulses designating the elapsed time of the call, a group of from one to twelve pulses designating the month, and a series of six digits of from one to ten pulses each designating the day, hour and minute that the call was completed. Each of the described digits, together with the elapsed time pulses, are recorded as mark pulses on the record tape of the recorder 125 and the digits are separated by space pulses also recorded on the record element of the recorder 125. Further, the last digit of the time-of-call data is followed by the described end-of-call signal.

During the record playback operation, the record element in the recorder 125 is, of course, driven by the common drive facilities commonly associated with the group of trunk recorders including the recorder 125. At the very start of this operation, an end-of-call signal, i.e., coincident mark and space pulses, is first released by the trunk recorder 125. This signal is utilized in the printing control circuit 235 to effect certain control operation therein, including that of setting a steering circuit 237 so that the first set of mark pulses transmitted by the recorder 125 will be registered in the first storage chain 238. As the mark pulses on the record tape of the recorder 125 are reproduced by the mark pulse head of this recorder, they are transmitted through the trunk circuit 119 and the playback control circuit 230 to the input terminals of the preamplifier circuit 233a. These pulses are amplified through the mark pulse preamplifier circuit 233a and impressed upon the input terminals of the mark pulse clipping amplifier 233. In the amplifier 233, the mark pulses are further amplified and clipped to uniform amplitude. These uniform amplitude pulses as they appear at the output terminals of the amplifier 233 are impressed upon the input circuits of all of the storage or counting chains 238, but are only registered in the particular storage chain which has been conditioned to receive mark pulses by the steering circuit 237. Specifically, the first digit of the first call recorded on the record tape of the recorder 125 is stored in the first storage chain 238, the second digit is stored in the second storage chain, and so on. The transfer of the repeated mark pulses of different digits from storage chain to storage chain is effected by the steering circuit 237 in its response to space pulses received from the trunk recorder 125. More specifically, the space pulse recorded on the record element of the recorder 125 are transmitted through the trunk circuit 119 and the playback control circuit 230 and are impressed upon the input terminals of the preamplifier circuit 232. These pulses are amplified through the space pulse preamplifier circuits 232 and impressed upon the input terminals of the space pulse clipping amplifier 234. After amplification through the latter amplifier, the space pulses are impressed upon the steering circuit 237. The steering circuit responds to each space pulse transmitted thereto by effecting a storage chain transfer operation in the manner explained below. It will thus be understood that all of the digits, together with the elapsed time pulses, recorded on the record element of the recorder 125 as a result of the particular call under consideration, are successively stored in different ones of the storage chains 238. In this regard, it is noted that after the digits representative of the directory numbers assigned to the calling and called subscriber lines have been registered in the storage chains 238, the steering circuit 237 acts to condition the cost computer 239 to accept and register the elapsed time or duration pulses which are repeated to the playback facilities from the trunk recorder 125 immediately following the last digit of the directory number assigned to the called subscriber line. The cost computer circuit 239 accepts these elapsed time pulses, but when the next space pulse is received by the steering circuit 237, this circuit acts to disable the cost computer circuit 239 against accepting any further pulses. Incident to the receipt of the elapsed time pulses, the cost computer circuit 239, having previously been advised by the printing control circuit 235 as to the destination of the call, computes the cost of the call to decimal code form.

When the next end-of-call signal, represented by coincident mark and space pulses, is received by the printing control circuit 235, this circuit is able to determine whether or not the call was successfully completed and hence whether or not a ticket should be printed on the call. If less than this number of groups of pulses is actually received and registered in the storage chains 238, the printing control circuit is instantly advised that the call was not successful and hence that no ticket should be printed. Under such circumstances, the printing control circuit 235 immediately clears the storage chains 238, restores the steering circuit 237 to normal, and recloses the operating circuit for the drive clutch magnet in the trunk recorder 125 to initiate a new call playback operation.

As indicated above, when the end-of-call signal is received by the printing control circuit 235, this circuit immediately deenergizes the drive clutch magnet of the recorder 125 to arrest the movement of the record tape in this recorder. Assuming that the number of groups of impulses registered in the storage chains 238 indicates that the call was successfully completed, the ticket printing operation is initiated immediately after the end-of-call signal is received by the printing control circuit 235. More specifically, when this signal is received, certain control relays in the printing control circuit 235 operate to initiate operation of a scanning switch which functions sequentially to scan the storage chains 238 and the storage chains of the cost computer 239, and to transfer the information registered therein into permutation code form which is fed to the permutation magnets of a printer 236. Thus, each time a storage chain 238 is read, the permutation magnets of the printer 236 are correspondingly excited, following which the printer prints the information registered in these magnets and then answers back to the scanning switch in the printing control circuit 235 advising this switch to take another step. The sequence of operations is repeated until all information registered in the storage chains 238 and the cost computer 239 is printed by the printer 236. Upon completion of the printing operation, the scanning switch of the printing control circuit 235 is automatically stepped to its home or normal position, the storage chains 238 are cleared or reset to normal, and the steering circuit 237 and cost computer circuit 239 are reset to normal. After these resetting operations are completed, the printing control circuit 235 recloses the operating circuit for the drive clutch magnet of the recorder 125 to restart movement of the record tape in the recorder 125 and thus initiate a new call playback operation.

The described call playback operations are repeated in the exact manner just described until the record tape in the recorder 125 has been cleared of all information recorded thereon. In this regard, it will be understood that immediately after the record tape passes by the combined recording and reproducing heads of the recorder 125, it passes by the erase head of this recorder so that the magnetic pulses impressed thereon are erased. Complete clearing of the record tape in the recorder 125 is indicated by movement of the tape back to its start position to effect reclosure of the start position contacts in the recorder. In response to this operation, the printing control circuit 235 measures off a predetermined time delay interval during which the drive clutch magnet of the recorder 125 is held energized to effect continued movement of the record tape in this recorder for a distance sufficient to permit recording of the date and time information of a very long call. After this delay interval is measured off, the printing control circuit 235 de-energizes the drive magnet of the recorder 125 to stop tape movement in the recorder, releases the trunk circuit 119, and effects advancement of the sequence switch 231 in the playback control circuit 230 to the setting corresponding to the next idle trunk circuit. Incident to the release of the trunk circuit 119, an end-of-call signal is recorded on the record tape to insure normalizing of the translating and printing facilities at the start of the next playback operation involving the trunk recorder 125. The end-of-call signal is followed by the usual tape advance operation. Also, incident to release of the trunk circuit 119, guarding ground potential is removed from the sleeve lead of the trunk 119a, thereby to render the trunk circuit accessible to the selectors of the exchange 107.

As indicated above, the playback and ticket printing facilities are normally associated with the trunk circuits on a periodic basis and then are sequentially connected with the trunk circuits through the step-by-step operation of the trunk circuit sequence switch 231 embodied in the playback control circuit 230. If for any reason, however, the recording capacity of any one of the trunk recorders should be nearly exhausted before the record tape thereof is cleared of information recorded thereon by the playback facilities in the manner just described, facilities are provided for immediately bringing the playback facilities into operative association with such a recorder. Thus, if this condition arises in the trunk recorder 125, for example, while a call through the trunk circuit 119 is in progress, the record tape of this recorder is advanced to close contacts in the recorder which results in operation of the trunk circuit 119 to prepare a circuit for applying ground potential to an emergency start conductor 230a and also to prepare a circuit for marking the trunk circuit as busy to the selectors having access thereto after the call in progress is terminated. These circuits are completed in the trunk circuit 119 when the call in progress is terminated and the switch train occupied with the call is released. Grounding of the lead 230a in the trunk circuit 119 has the effect of causing the playback control circuit 230 to associate the playback facilities with the trunk circuit 119 immediately after the playback operation, which may be in progress at the time the lead 230a is grounded, is completed. In other words, grounding of the lead 230a results in the setting up of preferential circuits which cause an interruption in the normal sequential association of the playback facilities with the trunk circuits and an immediate association of these facilities with the trunk circuit 119. Once the playback facilities are operatively associated with the trunk circuit 119, the playback operation required to clear the recorder 125 of the information stored therein is carried out in the exact manner explained above. In this regard, it will be understood that once the trunk recorder 125 is cleared of the information stored therein and the trunk circuit 119 is restored to normal, ground potential is removed from the lead 230a.

As indicated above, the playback control circuit 230 as controlled by the printing control circuit 235 is provided with apparatus for energizing an alarm device 244 to bring in a major alarm in the event of a failure in the system. Such failure may be caused by defective tubes, wiring failures, failure of the recording and reproducing heads of a trunk recorder, etc. The arrangement is such that if no successfully completed calls are evidenced to the translating and printing facilities during playback of any one of the trunk recorder tapes, the printing control circuit 235 transmits a signal to this effect to the playback control circuit. The latter circuit upon receiving this signal stops operating, locks up and energizes the alarm device 244 to signal the exchange attendant that trouble exists.

Trunk Recorder 125

Figure 3:
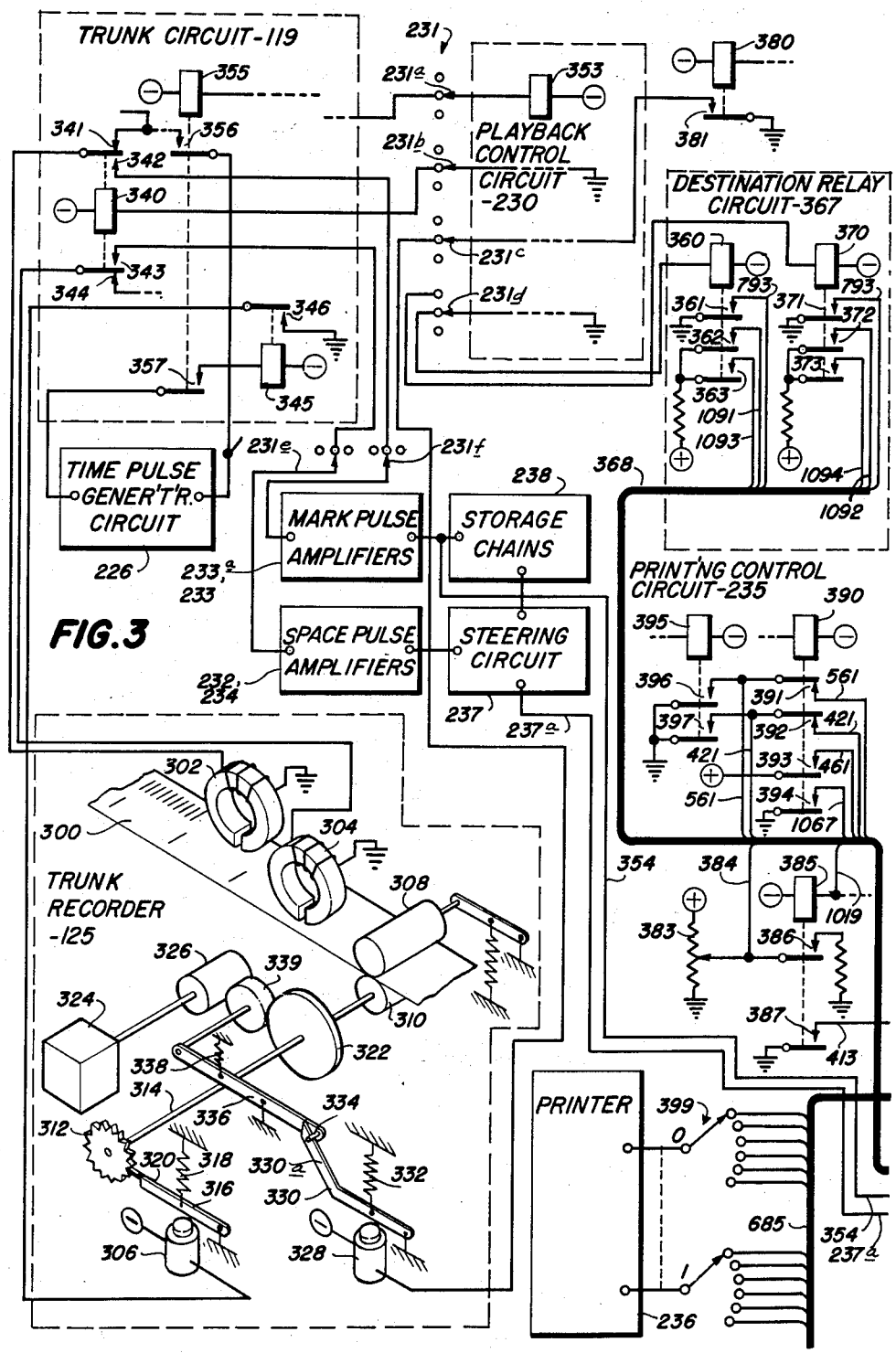
FIG. 3 is a fragmentary schematic drawing of components of the automatic toll ticketing system which are used in conjunction with the cost calculating means of the present invention.

The trunk recorder 125, in which the selected toll call data including the duration information is stored during the extension of a call and from which this data is transmitted during a playback operation, is shown in fragmentary schematic form in FIG. 3 of the drawings. This trunk recorder preferably is of the type shown and described in detail in United States Patent No. 2,867,435 to Howard S. Gleason. As illustrated, the trunk recorder 125 includes an endless loop of magnetic tape or film 300 adjacent to transversely disposed portions of which are disposed a mark pulse transducing head 302 and a space pulse transducing head 304. The transversely spaced disposition of these two transducing heads forms two separate data channels on the magnetic tape 300 for receiving mark and space pulse information. As described above, intelligence is stored on the tape 300 by providing a number of mark pulses equal to or proportional to the value of a digit to be entered, and space pulses are recorded on the tape between adjacent groups of mark pulses to separate successive digital entries. Further, a control or end-of-call signal comprising simultaneously recorded mark and space pulses is provided to indicate the end of the recorded data pertaining to a single toll call. The trunk recorder 125 further includes an erase transducing head (not shown) having an erasing gap effective over the entire transverse area of the tape 300, the erasing head being rendered effective during the playback operations to erase the previously transmitted information and thus condition the tape 300 for receiving the next items to be stored thereon.

The magnetic tape 300 in the trunk recorder 125 is advanced step-by-step following the recording of each mark or space pulse during information storing or recording operations and, to accomplish this, the trunk recorder includes a step-by-step drive mechanism actuated by an advance magnet 306. A resiliently and downwardly biased pinch roller 308 is disposed adjacent one surface of the magnetic tape 300 and a common capstan 310 is disposed in engagement with the opposite surface of the tape 300 immediately opposite the pinch roller 308. To provide a means for rotating the capstan 310 through short increments in a step-by-step manner during recording operations, a ratchet 312 is secured to the capstan 310 by a shaft 314. The advance magnet 306 is provided with a pivotally mounted armature 316 to which is connected a tension spring 318. When the advance magnet 306 is energized to move the armature 316 downwardly, a pawl 320 carried on the armature 316 engages a tooth on the ratchet wheel 312 and rotates the wheel 312 and the connected capstan 310 through a predetermined angular movement. This advances the magnetic tape 310 to a position for receiving the next impulse to be stored thereon.

As indicated above, the magnetic tape 300 in the trunk recorder 125 is advanced continuously during the transmission of the data pertaining to each call, this transmission being momentarily arrested while the previously transmitted data is recorded by the printer 236. To provide a continuous drive mechanism in the trunk recorder 125, a driven wheel 322 is secured to the shaft 314. A continuously energized motor 324 which is connected to a drive roller 326 provides a prime mover for rotating the driven wheel 322 and the capstan 310 secured thereto. To selectively render the continuous drive mechanism effective, a clutch magnet 328 is provided. A pivotally mounted armature 330 of the clutch magnet 328 forms a stop member which is normally urged upwardly by a tension spring 332 so that an end portion 330a thereof engages a detent 334 carried on a pivotally mounted lever 336. A tension spring 338 tends to pivot the lever 336 in a clockwise direction, as shown in FIG. 3, but this clockwise rotation is prevented by the engagement of the stop 334 and the detent portion 330a of the armature 330. When the clutch magnet 328 is energized to pivot its armature 330 downwardly or in a counterclockwise direction, the detent portion 330a thereof moves out of engagement with the stop 334 so that the spring 338 pivots the lever 336 in a clockwise direction to move an idler roller 339, which is rotatably mounted on the lever 336, into a position interposed between the drive roller 326 and the driven wheels 332, thereby placing the capstan 310 in rotation to continuously advance the magnetic tape 300. When the clutch magnet 328 is released, the spring 332 moves the armature 330 upwardly or in a clockwise direction so that the detent portion 330a of the armature 330 engages the stop 334 to move the idler roller 339 out of driving engagement with the drive roller 326.

In addition to the components of the trunk recorder 125 which are indicated schematically in FIG. 3, this trunk recorder also includes a sensing arrangement controlled by conductive portions carried on one surface of the tape 300 for indicating the effective beginning or home position of this tape. The trunk recorder mechanism 125 may also include a contact arrangement controlled by the clutch magnet for interrupting the operating circuit for the advance magnet 306, thereby to prevent operation of the pawl and ratchet type drive mechanism during the operation of the continuous drive mechanism.

*Recording Duration Information in the Trunk Recorder 125*

A set forth above, incident to the collection and storage of the items of information pertaining to each toll call, a group of pulses equal in number to the number of elapsed minutes in the length of a toll call is stored on the magnetic tape 300 in the trunk recorder 125 under the control of the trunk circuit 119. The circuits for recording this information in the trunk recorder 125 and a detailed description of the operation thereof is set forth in the above identified Morris et al. patent. However, FIG. 3 illustrates, in a fragmentary manner, some of the components in the trunk circuit 119 which are utilized during the recording of duration information in the trunk recorder 125.

More specifically, in response to the receipt of answering supervisory signals from a called substation, such as the substation C, a supervisory slave relay 355 is operated to close a plurality of contacts 356 and 357, among others. The closure of these two contacts prepares circuits for supplying mark pulses to the mark pulse transducing head 302 in the trunk recorder 125 and for periodically operating the advance magnet 306 therein. More specifically, the closure of the contacts 356 connects the time pulse generating circuit 226, which is common to a plurality of trunk circuits similar to the trunk circuit 119, with the operating winding of the mark pulse transducing head 302 through a pair of normally closed contacts 341. The time pulse generating circuit 226 provides grounded battery signals over the circuit including the closed contacts 356 and 341 at one minute intervals so that a mark pulse is recorded on the magnetic tape 300 at the end of each one-minute interval during the maintenance of an extended connection between a calling and a called subscriber. If desired, the generating circuit 226 could provide ground impulses and the winding of the transducing head 302 could be connected to grounded battery rather than ground. The closure of the contacts 357 connects the operating winding of a common pulse repeater relay 345 to the time pulse generating circuit 226 to prepare a circuit for operating the relay 345 immediately following the transmission of each grounded battery impulse to the mark pulse transducing head 302. In response to the transmission of each ground impulse through the closed contacts 357 to the common pulse repeater relay 345, a pair of contacts 346 are momentarily closed to cause the momentary operation of the advance magnet 306 in the trunk recorder 125. The periodic energization of the magnet 306 advances the magnetic tape 300 a single step immediately following the recording of each mark pulse thereon.

At the termination of the call, the supervisory slave relay 355 is released incident to the release of the connection so as to open the contacts 356 and 357, among others. The opening of the contacts 356 interrupts the above described path for supplying mark pulses for storage on the magnetic tape 300, and the opening of the contacts 357 interrupts the above described path for causing periodic operation of the advance magnet 306 in the trunk recorder 125. It will be noted that the time pulse generating circuit 226 is common to a plurality of trunk circuits similar to the circuit 119, and, accordingly, the generating circuit 226 is in continuous operation to provide mark pulses and advance magnet operating signals at the end of each one-minute interval. The supervisory relay in any selected trunk circuit, such as the circuit 119, is operated immediately upon the receipt of answering supervisory signals. These signals may be received at any time during the cycle of operation of the generating circuit 226, and, accordingly, a mark pulse representing an elapsed time of one full minute may be recorded on the magnetic tape 300 of the trunk recorder 125 following an actual elapsed time of merely a few seconds. However, means are provided in the cost computer 239 for insuring that the monetary charge to be assessed for each of these calls is not affected by the varying periods of time at which the first mark pulse is recorded on the magnetic tape 300.

*Playback Operation*

As indicated above and as described in detail in the above identified Morris et al. patent, when the items of information stored in the plurality of trunk recorders, including the trunk recorder 125, are to be played back or transmitted to control the operation of the printer 236, the playback control circuit 230 (FIG. 3) is placed in operation to advance the stepping switch 231 over its contacts to search for and seize each of the idle trunk circuits and its associated trunk recorder. The switch 231 includes a plurality of wipers 231a–231f which are advanced step-by-step so that a busy test is performed over a wiper 231a under the control of a switch relay 353 provided in the playback control circuit 230. When an idle trunk circuit, such as the circuit 119, is encountered during stepping operation, further movement of the switch 231 is arrested with the wipers 231a–231f in engagement with the contacts individual to the trunk circuit 119.

To prepare the trunk recorder 125 for transmitting information to the registers associated with the printer 236, the wiper 231b completes an operating circuit for a playback switch relay 340 in the trunk circuit 119, thereby operating this relay to open the contacts 341 and 344 and to close a plurality of contacts 342 and 343, among others. The opening of the contacts 341 disconnects the mark pulse transducing head 302 from the pulse generating circuits controlled by the trunk circuit 119, which are utilized during data recording operations, and the concurrent closure of the contacts 342 connects the winding of the transducing head 302 to the input of the mark pulse amplifiers 233a and 233 through the wiper 231f of the stepping switch 231. The completion of this path prepares the head 302 for reproducing mark signals for transmission through the mark pulse amplifiers 233a and 233 to an output mark pulse conductor 354 which is common to all of the storage chains 238 and also to the cost computer 239. Therefore, when the magnetic tape 300 is advanced to induce signals in the transducing head 302, these signals are amplified and clipped and are extended to the inputs of all of the storage devices in the playback facilities by the common mark pulse conductor 354.

The opening of the contacts 344 and the closure of the contacts 343 disconnect the space pulse head 304 from local control circuits in the trunk circuit 119 and connect the winding of the head 304 to the input of the space pulse amplifiers 232 and 234 through the wiper 231e of the stepping switch 231. Accordingly, when the magnetic tape 300 in the trunk recorder 125 is advanced, the space pulses induced in the head 304 are amplified and clipped in the circuit components 232 and 234 and supplied to the steering circuit 237. As described in detail in the above identified Morris et al. patent, the steering circuit 237 sequentially supplies enabling potentials to the input or drive tubes in the plurality of storage chains 238 and in the cost computer 239 so that the various groups of mark pulses appearing on the common mark pulse conductor 354 are rendered effective in sequence to control the operation of only a single one of the storage chains.

Returning now to the operation of the stepping switch 231 incident to seizure of the trunk circuit 119, the movement of the wiper 231b into engagement with the contact associated with the trunk circuit 119 completes a circuit for providing the printing control circuit 235 and the cost computer 239 with information relating to the designation of the called exchange 108 and the rate structure to be utilized in assessing monetary charges for calls extended to this exchange. More specifically, the ground supplied to the wiper 231d is extended to a first destination or rate relay 360 in a destination relay circuit 367, thereby operating this relay to close a plurality of contacts 361, 362, and 363, among others. The rate information provided by the operation of the relay 360 comprises a base time period for which an initial charge is assessed and an overtime interval for each of which a cost increment is to be added to the initial charge. Since the destination or rate relay 360 is operated in response to seizure of the trunk circuit 119 and since the trunk recorder 125 associated with this trunk circuit stores data pertaining to calls extended only to the remote exchange 108, the relay 360 remains operated during the entire period that the trunk circuit 119 is seized to provide uniform rate information to the cost computer 239 for use in establishing charges for each of the individual calls whose data is stored on the magnetic tape 300.

As an illustration, it is assumed that an initial charge of ten cents is to be assessed for a call having a base time period equal to or less than three minutes and that an additional cost increment of five cents is to be assessed for each additional overtime interval of one minute. The information relating to the base time interval is supplied by the closure of the contacts 361 to ground a conductor 793 which extends to the cost computer 239 through a cable 368. The information relating to the initial charge of ten cents is provided by closing the contacts 362 and 363 to connect resistance B+ potential to a pair of conductors 1091 and 1093 which extend to the computer 239 over the cable 368. The B+ potential applied to the conductor 1091 represents a units cents digit of "0" and is utilized to prime the computer 239 to a units cents manifestation of "0." Similarly, the B+ potential connected to the conductor 1093 represents a tens cents digit "1" and primes the cost computer 239 to provide a manifestation of this digit.

In the event that the trunk circuit 140 extending to the remote exchange 109 in which the called substation D is located is seized by the playback control circuit 230, the wiper 231b operates a second destination or rate relay 370 to close a plurality of contacts 371, 372, and 373. Assuming that the rate structure applicable to calls to the remote exchange 109 comprises a base time period of three minutes for which an initial charge of twenty-five cents is to be made and that an additional charge of five cents is to be made for each additional minute of overtime, the closure of the contacts 372 and 373 applies B+ potential to a plurality of conductors 1092 and 1094 extending to the computer 239 through the cable 368 representing the units cents digit "5" and the tens cents digit "2," respectively. The closure of the contacts 371 applies ground to the conductor 793 to prime the computer 239 with the three-minute base time period information.

Referring back to the seizure of the trunk circuit 119 by the playback control circuit 230, the wiper 231c prepares a path for initiating movement of the magnetic tape 300 in the trunk recorder 125 so that the data stored thereon is transmitted to the data storing and printing facilities through the amplifiers 232, 233, 233a, and 234. This circuit is selectively controlled by a relay 380 in the printing control circuit 235. Following the completion of the seizure of the trunk circuit 119 and its associated trunk recorder 125, the printing control circuit 235 operates the relay 380 to close a pair of contacts 381, among others, in the manner described in detail in the above identified Morris et al. patent. This ground is extended over the wiper 231c to operate the clutch magnet 328 so that the detent portion 330a of the armature 330 is displaced to permit the idler roller 339 to be interposed between the driving roller 326 and the driven wheel 322. The completion of this operative drive places the capstan 310 in continuous rotation so that the magnetic tape 300 is advanced to initiate the transmission of mark and space pulse information.

As described above, the first item of information stored on the tape 300 is the preliminary end-of-call signal comprising simultaneous mark and space pulses which are transmitted through the amplifiers 232, 233, 233a, and 234 to the printing control circuit 235 and utilized therein to restore all of the storage chains 238 and the cost computer 239 to a normal condition, thereby removing any abnormal registrations which may have been provided incident to the seizure of the trunk circuit 119. The transmission and receipt of the preliminary end-of-call signal releases the relay 380 to open the contacts 381 so that the magnetic tape 300 is not advanced during the resetting operation. Upon completion of the resetting operation, the contacts 381 are again closed to cause the transmission of the items of information pertaining to the first toll call from the trunk recorder 125 to the storage chains 238.

As described above, the steering circuit 237 is operated by the transmitted space pulses to sequentially render the plurality of storage chains 238 effective to receive and store the items of information pertaining to the first call represented by the transmitted groups of mark pulses provided on the common mark pulse conductor 354. Following the storage of the calling and called station designation, the space pulse immediately preceding the group of mark pulses representing the duration of the toll call operates the steering circuit 237 to remove the enabling potential from the input or drive tube in the preceding storage chain 238 and to apply a positive enabling potential to a conductor 237a which extends to the input of an elapsed time counter 600 forming a part of the cost computer 239. This enabling potential renders the elapsed time counter 600 and the remainder of the cost computer 239 responsive to the group of duration pulses next to be transmitted from the trunk recorder 125.

*Elapsed Time Counter 600*

The elapsed time counter 600 (FIGS. 4, 5, and 6) is operated by the group of mark pulses representing call duration to provide an electronic manifestation or registration of the duration of the toll call. To this end, the elapsed time counter 600 is provided with a units minutes counting ring 500 and a tens minutes counting chain 400 comprising progressively advanced counting circuits of the type shown and described in detail in the above identified patent to Frank A. Morris et al.

The input of the units minutes counting ring 500 is connected to the mark pulse conductor 354 so that the group of duration mark pulses sequentially advances this ring in accordance with the number of mark pulses therein. This group of mark pulses contains a plurality of discrete pulses equal in number to the minutes of the duration of a particular toll call. In addition, the output of the ring 500 is interconnected with the input of the tens minutes counting chain 400 so that this counting chain is advanced a single step in response to each complete cycle of operation of the units minutes counting ring 500.

The units minutes counting ring 500 includes a drive tube 550, a normally conductive prime tube 560 representing "0," and a plurality of counting tubes 570, 610, 620, 630, 640, 650, 660, 670, and 680 representing the digits "1"–"9," respectively. The control electrodes of each of the counting tubes and the prime tube are provided with a normal operating potential by a voltage divider 383 in the printing control circuit 235 which is connected to these starting or control electrodes by a conductor 384 which extends to the elapsed time counter 600 through the cable 368. The anode of each of the counting tubes and the prime tube is connected to the starting electrode of the next succeeding tube in the counting ring by a coupling condenser similar to a condenser 567 connecting the anode of the prime tube 560 with the control electrode of the "1" manifesting tube 570. The anodes of each of the counting tubes and the prime tube are connected to a suitable source of B+ potential through individual anode resistors, similar to a resistor 564 provided in the anode circuit of the prime tube 560. The cathodes of all of the counting tubes are connected to ground through a common cathode resistor 563 in the cathode circuit of the prime tube 560 over a circuit including a conductor 561 and a pair of normally closed contacts 391 controlled by a reset relay 390 in the printing control circuit 235, the conductor 561 extending between the elapsed time counter 600 and the printing control circuit 235 through the cable 368. Since the prime tube 560 is normally in a conductive condition, a positive potential is normally applied to the cathodes of all of the counting tubes in the units minutes counting ring 500.

As described above, when the elapsed counter 600 is rendered responsive to receive the group of duration mark pulses, a positive enabling potential is connected to the conductor 237a by the steering circuit 237, and this potential is extended to the control electrode of the drive tube 550 to render this tube responsive to applied mark pulses. Accordingly, when the first mark pulse in the group of pulses representing the duration of a toll call is applied to the common mark pulse conductor 354, this pulse is coupled through a condenser 554 to fire the drive tube 550. In being rendered conductive, the tube 550 produces a relatively large voltage drop across a cathode resistor 552 of relatively large magnitude so that charging current for a condenser 553 flows from ground through the common cathode resistor 563 to raise the potential of the cathode of the prime tube 560 and of the cathodes of all of the counting tubes in the units minutes ring 500. The prime tube 560, which is in a conductive condition, is extinguished by the increased positive potential provided across the common cathode resistor 563 inasmuch as this voltage drop together with the potential drop across its anode resistor 564 is such that conduction can no longer be sustained.

The anode of the drive tube 550 is connected directly to B+ potential so that, upon being rendered conductive, the large value of its cathode resistor 552, by reducing the effective potential applied across the tube 550 or by reducing the current flow therethrough necessary to maintain ionization, extinguishes the drive tube 550 by relaxation to permit this tube to be again rendered conductive under the control of the next mark pulse applied through the condenser 554. The termination of the charging current for the condenser 553 reduces the voltage drop across the common cathode resistor 563 to a point such that, when the tube 560 is extinguished, as described above, a positive pulse is coupled through the condenser 567 to the starting or control electrode of the "1" manifesting tube 570, this tube is rendered conductive to manifest a units minutes digit "1" representing the receipt of a single mark pulse by the units minutes counting ring 500. In a similar manner, the tubes 610, 620, 630, 640, 650, 660, 670, and 680 are sequentially rendered conductive under the control of additional mark pulses applied to the control electrode of the drive tube 550.

When the tenth mark pulse in a given group of duration pulses is applied to the drive tube 550, the "9" manifesting tube 680 is extinguished to provide a positive going pulse at the anode thereof for controlling step-by-step operation of the tens minutes counting chain 400 and for firing the prime tube 560, which manifests "0." More specifically, when the "9" manifesting tube 680 is extinguished, a positive pulse is coupled through a condenser 566 to the control electrode of the "0" manifesting tube 560, thereby rendering this tube conductive. Accordingly, in response to the application of each ten mark pulses, the units minutes counting ring 500 is advanced through a single cycle of operation.

The tens minutes counting chain 400 comprises a drive tube 410, a normally conductive prime or "0" manifesting tube 420, and a plurality of cold cathode counting tubes 430, 440, 450, 460, 470, 480, 510, 520, and 530 representing the tens minutes digits "1"–"9," respectively. The circuitry and the operation of the chain 400 is similar to the ring 500 and, accordingly, is not described in detail. The cathodes of the plurality of counting tubes are connected to a common cathode resistor in the cathode circuit of the prime tube 420 by a pair of normally closed contacts 392 and a conductor 421 which extends to the printing control circuit 235 through the cable 368. Also, the control electrodes of the prime tube 420 and of the remaining counting tubes in the chain 400 are provided with positive bias from the potentiometer 383 through the conductor 384.

The tens minutes counting chain 400, as described above, is advanced a single step in response to each cycle of operation of the counting ring 500. When the "9" tube 680 is extinguished, a positive pulse is coupled through a condenser 415 to the control electrode of the drive tube 410. This control electrode is provided with a fixed bias so that the drive tube 410 is momentarily fired by each pulse supplied by the ring 500 to advance the chain 400 a single step. The sequential application of positive pulses to the control electrode of the drive tube 410 under the control of each cycle of operation of the units minutes counting ring 500 produces a sequential energization of the tubes comprising the counting chain 400 so that, at any particular given time, a conductive tube in the units minutes counting ring 500 and a conductive tube in the tens minutes counting chain 400 electronically manifest the total of the number of pulses received from the mark pulse conductor 354 representing the duration of the toll call in minutes.

In order to make the information electronically manifested or registered in the elapsed time counter 600 available to the printing control circuit 235, the output anodes of the tubes in the units minutes counting rings 500 are interconnected with like designated contacts in a selected stepping position of a stepping switch 399 in the printing control circuit 235 by a plurality of conductors 565 and 615 which extend to the printing control circuit 235 through a cable 685. The output anodes of the plurality of tubes in the tens minutes counting chain 400 are connected to like designated contacts forming another stepping position of the stepping switch 399 by a plurality of conductors 491 and 511 which extend to the printing control circuit 235 through the cable 685.

The information electronically registered or manifested in the elapsed time counter 600 is utilized by the printing control circuit 235 by operating control elements associated with the printer 236 in accordance with the flow of current through the tubes selectively rendered conductive. In order to provide an increased flow of current through the conductive tubes, the printing control circuit 235, when it is desired to initiate the production of a printed toll ticket, operates a second prepare-to-read relay 395 which closes a plurality of contacts 396 and 397, among others, to connect the commonly connected cathodes of the plurality of counting tubes in the units minutes counting ring 500 and in the tens minutes counting chain 400 directly to ground, thereby resulting in an increased flow of current through the conductive tubes.

In addition to grounding the commonly connected cathodes of the tubes forming the counting chain 400 and the counting ring 500, when data is to be recorded, the printing control circuit 235 operates a prepare-to-read relay 385 to close a plurality of contacts 386 and 387, among others. The closure of the contacts 387 applies ground to a conductor 413 which is connected to the control electrode of the drive tube 410 in the counting chain 400. The ground applied to the control electrode of this tube renders the drive tube 410 insensitive to spurious voltages which may be coupled thereto and, accordingly, prevents the drive tube 410 from operating during the time that the information manifested in the chain 400 is being utilized by the printer 236 to prevent any possibility of producing a false indication of the value of the tens minutes digit. The closure of the contacts 386 connects a low resistance shunt across a portion of the potentiometer 383 to reduce the biasing potential applied to the control electrodes of the tubes in the circuits 400 and 500 to render these tubes insensitive to spurious voltages which may be provided incident to the data recording operation.

Following the production of a printed ticket including the items registered in the storage chains 238, the printing control circuit 235 releases the prepare-to-read relays 385 and 395 and operates a reset relay 390, thereby to condition the elapsed time counter 600 for another cycle of operation under the control of the next group of mark pulses representing the duration of the next succeeding call. The release of the relay 385 opens the contacts 386 to increase the biasing potential supplied to the counting tubes in the chain 400 and the ring 500 and opens the contacts 387 to remove ground from the control electrode of the drive tube 410 in the chain 400. The release of the relay 395 opens the contacts 396 and 397 to disconnect direct ground from the cathodes of the counting tubes in the chain 400 and the ring 500. The operation of the reset relay 390 opens the contacts 391 and 392 to disconnect the commonly connected cathodes of the tubes representing "1"–"9" in both the units minutes counting ring 500 and the tens units counting chain 400 from the common cathode resistors therein so that the conductive tubes are extinguished.

In addition, the operation of the reset relay 390 closes a pair of contacts 393 to apply a positive biasing potential to a conductor 461 which is connected to the control electrodes of the prime tubes 420 and 560. The application of this biasing voltage renders these two prime tubes conductive so that, prior to the receipt of the next group of duration pulses on the conductor 354, the tens minutes counting chain 400 and the units minutes counting ring 500 are reset to a normal operating condition representing an elapsed time of "00" minutes. The firing of the prime tubes 420 and 560 does not vary the non-conductive state of the remainder of the tubes forming the counting chain 400 and the counting ring 500 inasmuch as the cathodes of the counting tubes are disconnected from the cathode resistors controlled by the prime tubes. Following a predetermined interval of time, the reset relay 390 in the printing control circuit 235 is released to reestablish the conductive paths provided by the conductors 421 and 561 so that the cathodes of the counting tubes are connected to the common cathode resistors in the cathode circuits of the prime tubes 420 and 560. The release of the reset relay 390 also removes the positive biasing voltage from the conductor 461 and thereby conditions the elapsed time counter 600 for operation under the control of the next group of mark pulses representing the duration of the next succeeding toll call.

Accordingly, the printing control circuit 235, following the production of a permanent record containing the items of information pertaining to a particular toll call, conditions the elapsed time counter 600 to receive the items of information pertaining to the next toll call. This resetting operation is accomplished by opening the leads 421 and 561 so that all of the counting tubes in the counting chain 400 and counting ring 500 are extinguished. Further, the resetting operation of the printing control circuit 235 places a positive bias on the control electrodes of the two prime tubes 420 and 560 so that these tubes are primed conductive to manifest an elapsed time of "00."

In summary, the elapsed time counter 600 is rendered effective under the control of the steering circuit 237 to receive the group of mark pulses on the mark pulse conductor 354 pertaining to the duration of a particular toll call. These received mark pulses sequentially advance the counting ring 500 and, if the duration of the call exceeds nine minutes, also advance the tens minutes counting chain 400. At the end of the group of mark pulses, a single tube is conducting in both the tens minutes counting chain 400 and the units minutes counting ring 500 to produce an electronic manifestation or registration of the total number of minutes of elapsed time in a particular toll call. The information provided by the electronic manifestation of the duration of the toll call produced by the elapsed time counter 600 is connected to the printer 236 by the stepping switch 399 in the printing control circuit 235 and utilized to produce a toll ticket providing a permanent record of the duration of this particular toll call.

The elapsed time counter 600 is conditioned for transmitting the registered information and is also reset under the control of the printing control circuit 235 so that, in a normal operating condition, the "0" manifesting tube 560 in the units minutes counting ring 500 and the "0" manifesting tube 420 in the tens minutes counting chain 400 are rendered conductive to manifest a total elapsed time of "00" minutes. The resetting operation also extinguishes any of the counting tubes which may have been rendered conductive by the preceding group of pulses so that the only tubes rendered conductive in the elapsed time counter 600 are the two "0" manifesting tubes. Following the selective operation of the elapsed time counter 600 to electronically manifest the duration of the toll call, the positive bias is removed from the conductor 237*a* by the steering circuit 237 so that this counter is no longer effective to receive and utilize pulses provided on the mark pulse conductor 354.

Cost Computer 239

The cost computer 239 (FIGS. 7–10) is provided with rate information based on the exchanges in which the calling and called subscribers are located and is also provided with information relating to the duration of each of the toll calls so that the cost computer 239 is enabled to produce an electronic manifestation of the total cost or charge to be assessed for each toll call. The cost computer 239 is rendered effective to calculate the cost of each toll call in response to the application of the positive biasing potential by the steering circuit 237 to the control electrode of the drive tube 550 in the units minutes counting ring 500 in the elapsed time counter 600. Therefore, the pulses representing the duration of the call are not only applied to actuate the elapsed time counter 600, but also to operate the cost computer 239 in parallel with the counter 600.

The cost computer 239 includes a base time counting chain 700, a units cents counting ring 900, a tens cents counting ring 725, and a units dollars counting chain 905. The cost computer 239 is provided with information pertaining to the exchange in which the called subscriber is located by the printing control circuit 235, and, more particularly, the base time counting chain 700 is provided with information relating to the minimum base time period for which a predetermined minimum or initial charge is to be assessed in accordance with the called exchange. The monetary portion of the cost computer 239 comprising the units cents counting ring 900, the tens cents counting ring 725, and the units dollars counting chain 905 is provided with information relating to the initial monetary charge to be assessed for the predetermined minimum base time period primed into the base time counting chain 700. This minimum cost information is primed into the units cents counting ring 900 and the tens cents counting ring 725 by selectively rendering a single tube in each of these two counters conductive under the control of the printing control circuit 235, thereby to manifest a predetermined minimum charge. The minimum charge information, which is primed into the units cents counting ring 900 and the tens cents counting ring 725, is applied to these components of the computer 239 to assess a minimum charge even though the duration of the call does not extend up to the full minimum base time period established in the base time counting chain 700. The minimum charge is varied in accordance with that portion of the duration of a particular call which is greater than the base time period.

The base time counting chain 700 comprises a drive tube 710, a prime tube 730, and a plurality of counting tubes 750, 755, 770, 800 and 830. The basic operating principle of the counting chain 700 is similar to that described in detail above in conjunction with the counting ring 500, and this operation is merely modified to adapt this basic type of counting circuit for use as a base time counter. The control electrodes of the plurality of cold cathode tubes forming the counting chain 700 are provided with a positive biasing voltage from a potentiometer 981. The cathode resistor of the prime tube 730 is connected to the commonly connected cathodes of the remainder of the counting tubes in the counting chain 700 through a conductor 731 and a pair of normally closed contacts 1062.

To provide means for pulsing the drive tube 710, the cathode resistor of the prime tube 560 in the units minutes counting ring 500 is connected to the control electrode of the tube 710 by a conductor 551 so that, each time the drive tube 550 fires, the tube 710 is also momentarily rendered conductive. The first firing of the drive tube 710 produces a large voltage drop across its cathode resistor so that the normally conductive prime tube 730 is extinguished and the next serially connected counting tube 750 is fired. The receipt of this first pulse to fire the drive tube 710 and the counting tube 750 and to extinguish the prime tube 730 indicates that one mark pulse has been received by the drive 550 of the elapsed time counter 600. The next mark pulse received by the drive tubes 550 and 710 extinguishes the counting tube 750 and fires the counting tube 755, thus indicating that the elapsed duration of a particular toll call is now two minutes.

Figure 7:
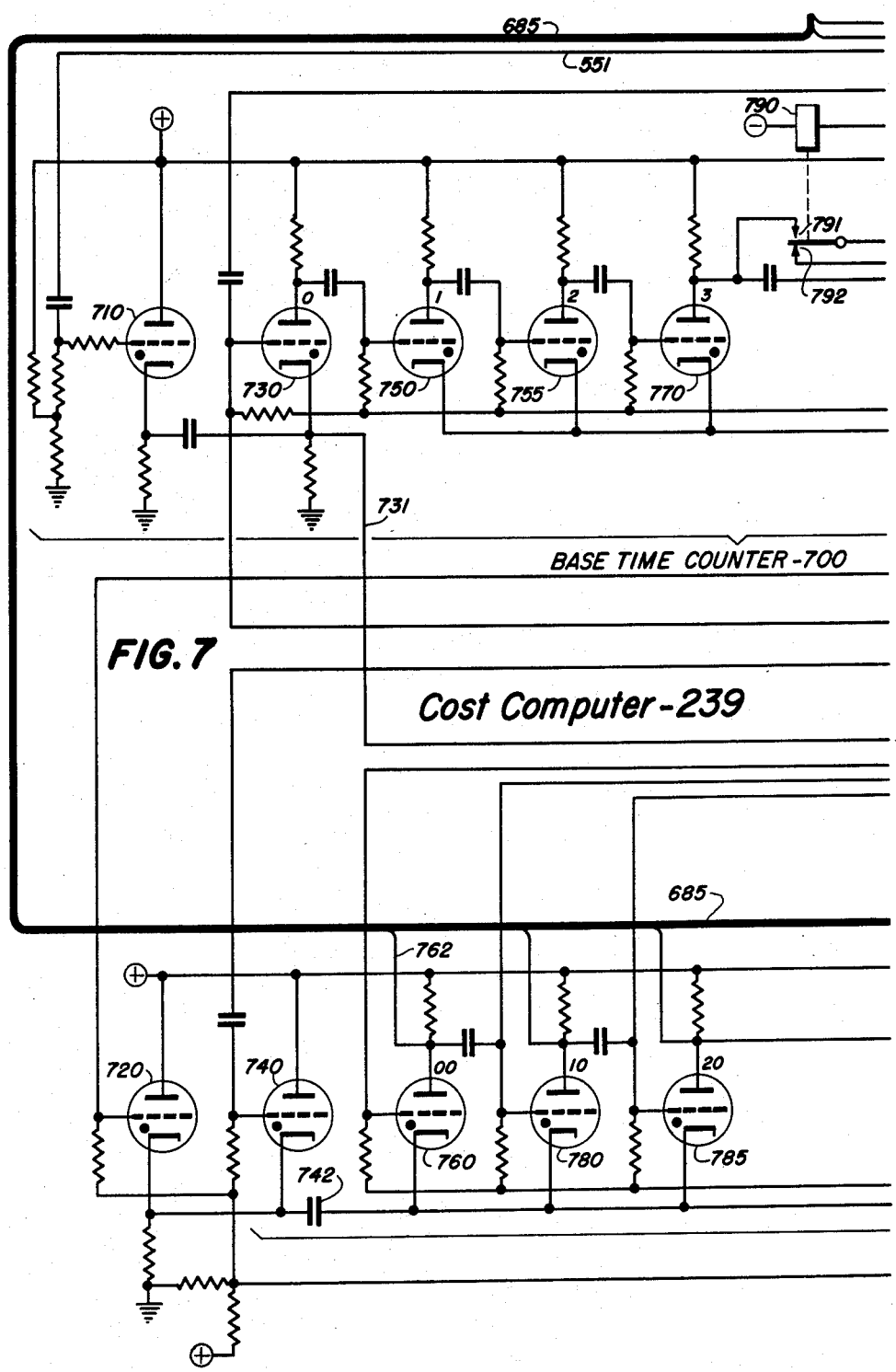

The remaining tubes of the counting chain 700, i.e. tubes 770, 800, and 830, are selectively controlled by a pair of relays 790 and 820 so that the length of the counting chain 700 can be varied in accordance with the minimum base time assigned to calls extending to a particular called exchange. As shown in FIGS. 7 and 8 of the drawings, none of the relays 790 or 820 are operated so that, in response to receipt of the third, fourth, and fifth mark pulses, the tubes 770, 800, and 830 are sequentially fired. Accordingly, the base time counting chain 700 with neither of the relays 790 or 820 operated is conditioned to receive five mark pulses representing a five-minute base time period assigned to a particular called exchange or rate structure.

However, if the minimum base time period assigned to a particular called exchange is three minutes, the destination relay circuit 367 in the printing control circuit 235 grounds the conductor 793, as described above, to provide the computer 239 with this information. The application of ground to the conductor 793 operates the relay 790 to close a pair of contacts 791 and to open a pair of contacts 792. The relay 790 is operated before any pulses are applied to the control electrode of the drive tube 710 so that, when the tube 770 is extinguished by the fourth mark pulse, the positive pulse at the anode of this tube is applied through the closed contacts 791 to the control electrode of a gate tube 850. The opening of the contacts 792 interrupts all other operating paths for the gate tube 850 so that this tube can be energized only from the anode of the tube 770, indicating a minimum base time period of three minutes.

The relay 820, representing a four-minute base time interval, although not shown as being connected with the printing control circuit 235, may be selectively operated by this control circuit to close a pair of contacts 821 and to open a pair of contacts 822. The opening of the contacts 822 disconnects the control electrode of the gate tube 850 from the anode of the counting tube 830. The closure of the contacts 821 interconnects the control electrode of the gate tube 850 with the anode of the counting tube 800. The counting tube 800 is extinguished in response to the receipt of the fifth mark pulse by the drive tubes 550 and 710 so that the operation of the relay 820 indicates that the minimum base period of time assigned to a particular called exchange is four minutes. Therefore, the counting length of the base time counting chain 700 is variably extended or shortened to manifest a particular minimum base time period under the control of the printing control circuit 235 by selectively operating either of a pair of relays 790 or 820. If the relay 790 is operated, the minimum base time period assigned to a particular called exchange is three minutes; if the relay 820 is operated, the minimum base time period assigned to a particular called exchange is four minutes; and if neither of these relays is operated, the assigned minimum base time period is five minutes.

The application of the positive pulse to the control electrode of the gate tube 850 from the anode of one of the tubes in the chain 700 fires the gate tube 850 to increase the bias on the control electrode of a drive tube 880 in the units cents counting ring 900. When the gate tube 850 is rendered conductive, current flows through a cathode resistor 881 to supply a positive bias to the control electrode of the drive tube 880. This positive bias renders the drive tube 880 responsive to pulses coupled thereto from the cathode resistor 563 of the prime tube 560 through the conductor 551.

Therefore, the base time counting chain 700 renders the drive tube 880 of the units cents counting ring 900 responsive to pulses received from the drive tube 550 of the elapsed time counter 600 following a predetermined interval of time which is equal to the minimum base period of time for which an initial charge is assessed for each of the plurality of toll calls extended to a particular called exchange. Inasmuch as the relays 790 and 820 are operated by the printing control circuit 235 in response to the association of the printing control circuit 235 with a particular one-way trunk circuit capable of extending calls to only a single called exchange, these relays are operated before the removal of any of the recorded information from the seized trunk recorder and remain operated until such time as the seized recorder is dismissed.

In addition to the drive tube 880, the units cents counting ring 900 includes a plurality of counter tubes 910, 930, 950, and 980, which alternately manifest "0" and "5" cents in the order named. The control electrodes of the counting tubes 910, 930, 950, and 980 are connected to the source of positive biasing potential 981 through a plurality of contacts 1015, 1016, 1017, and 1018, respectively. The cathodes of these tubes are connected to ground through a resistor 1019a and a pair of normally closed contacts 1064. The fundamental operation of the units cents counting ring 900 is similar to that described above in conjunction with the ring 500.

Since the control electrode of the drive tube 880 is supplied with pulses, each representing a one-minute interval in the duration of a particular toll call, counting tubes are provided for only manifesting "5" or "0," inasmuch as the charge for each minute of the duration of a toll call above the minimum base time period is five cents. Accordingly, there is no need to provide additional counting tubes for manifesting digits other than "5" or the cipher. At the time that the first pulses are transmitted to the cost computer 239 from the elapsed time counter 600, one of the tubes 910 or 930 has been rendered conductive under the control of the printing control circuit 235, as described hereinafter, to indicate the value of the units cents digit of the minimum or initial charge to be assessed for a toll call having a duration equal to the predetermined base time primed into the base time counting chain 700.

The first effective pulse applied to the drive tube 880 of the units cents counting ring 900 fires the drive tube 880 to extinguish the one of the tubes 910 or 930 which previously had been rendered conductive under the control of the printing control circuit 235. If the "0" manifesting tube 910 is initially conducting, the first pulse effective to fire the drive tube 880 extinguishes the counting tube 910 and fires the "5" manifesting tube 930. The second effective pulse received by the control electrode of the drive tube 880 extinguishes the "5" manifesting tube 930 and fires the "0" manifesting tube 950. The third effective pulse applied to the units cents counting ring 900 fires the "5" manifesting tube 980, and the fourth pulse received extinguishes the tube 980. The positive pulse produced at the anode of the extinguished tube 980 is returned to the control electrode of the "0" manifesting tube 910 through a coupling condenser 885 so that this tube is fired to manifest "0" in response to the receipt of four pulses from the elapsed time counter 600. In this manner, the successive application of a plurality of positive pulses to the control electrode of the drive tube 880 from the elapsed time counter 600 produces an alternate manifestation of either "0" or "5" and, accordingly, adds a five-cent charge to the cumulative total carried in the units cents counting ring 900 in response to the receipt of each pulse representing the expiration of one minute.

To provide a means for utilizing the cost information in the units cents denominational order, the anodes of the "0" manifesting tubes 910 and 950 are interconnected through a pair of normally open contacts 1031, and the anodes of the "5" manifesting tubes 930 and 980 are interconnected through a pair of normally open contacts 1032. A pair of conductors 912 and 913 connected to the output anodes of the "0" manifesting tubes 910 and 950 and the "5" manifesting tubes 930 and 980, respectively, extend to similarly designated contacts in a single stepping position of the switch 399 in the printing control circuit 235 through the cable 685.

The tens cents counting ring 725 includes a pair of drive tubes 720 and 740, and a plurality of counting tubes 760, 780, 785, 810, 840, 860, 870, 890, 920, and 940. The cathodes of the counting tubes are connected in common and to ground through a resistor 1045 and a pair of normally closed contacts 1065. The control electrodes of the plurality of counting tubes in the tens cents counting ring 725 are provided with a positive bias from the potentiometer 981. Also, the cathodes of the counting tubes in the tens cents counting ring 725 are connected to the cathode resistor of the drive tubes 720 and 740 through a coupling condenser 742 so that the counting ring 725 functions in a similar manner to that described above in conjunction with the ring 500 in the elapsed time counter 600.

To provide a means for advancing the tens cents counting ring 725, the control electrode of the first drive tube 720 is connected to the output anode of the "5" manifesting tube 930 in the units cents counting ring 900. Since the drive tube 720 is fired in response to the interruption of conduction through the tube 930, a positive pulse is applied to the control electrode of the drive tube 720 following the receipt of two pulses by the drive tube 880 in the units cents counting ring 900, i.e. assuming that the tube 910 is normally conductive. Therefore, the drive tube 720 is rendered conductive in response to the receipt of two pulses signifying that an additional charge of ten cents is to be added to the initial charge to be assessed for this particular call. Assuming that the "5" manifesting tube 930 is primed on under the control of the printing control circuit 235, the receipt of a single pulse by the drive tube 880 extinguishes the tube 930 and, accordingly, couples a positive voltage to the control electrode of the drive tube 720 so that the tens cents counting ring 725 is operated to manifest an additional charge of ten cents in accordance with the five cents added by the pulse received by the drive tube 880 and the five cents previously manifested by the units cents counting ring 900.

The control electrode of the second drive tube 740 is connected to the plate of the second "5" manifesting tube 980 so that, when this tube is extinguished, a positive pulse is applied to the control electrode of the drive tube 740 to place this tube in a conductive state. Therefore, two drive tubes 720 and 740 are provided for the tens cents counting ring 725 so that this counting ring is advanced in response to the receipt of two pulses by the units cents counting ring 900 or, alternatively, in response to a single pulse if a "5" manifesting tube is originally conducting, and thereafter upon the receipt of two additional pulses representative of a two minute interval or of an additional ten cents which is to be added to the cumulative total charge manifested by the cost computer 239. The firing of either of the drive tubes 720 or 740 selectively interrupts the conduction through any normally fired tube in the ring 725, and, upon interruption of this conduction, the next succeeding tube in the serially connected tubes forming the tens cents counting ring 725 is fired in the manner described above. Therefore, the application of a pulse to the control electrode of either of the drive tubes 720 or 740 in response to the interruption of conduction through either of the "5" manifesting tubes 930 or 980 indicates that an additional ten cent charge is to be added to the cumulative total carried by the tens cents counting ring 725.

This sequential energization of the drive tubes 720 and 740 sequentially advances the counting ring 725 so that the counting tubes therein are fired and extinguished in order. When the last tube 940 is extinguished, thus indicating that a cumulative total of one dollar has been entered into this counting ring, a positive pulse is coupled back to the control electrode of the "0" manifesting counting tube 760 to render the tube 760 conductive, thereby to indicate that the digit in the tens cents denominational column of the total charge to be assessed for the call is "0."

In order to provide means for utilizing information electronically manifested or registered in the tens cents counting ring 725, the plates of the plurality of counting tubes therein are connected to a plurality of conductors 762, 891, and 921 which extend through the cable 685 to the switch 399 in the printing control circuit 235. Each of these conductors interconnects a digit manifesting tube in the ring 725 with a similarly designated contact in one predetermined stepping position of the stepping switch 399.

The interruption of conduction through the "9" manifesting tube 940 produces a positive pulse which is applied to the control electrode of a drive tube 960 in the units dollars counting chain 905. The units dollars counting chain 905, in addition to the drive tube 960, includes a prime or "0" manifesting tube 970, and a plurality of counting tubes 990, 1020, 1050, and 1070 representing the units dollars digits "1"-"4," respectively. The control electrodes of the prime tube 970 and the counting tubes are provided with a positive bias from the potential source 981. The cathodes of the counting tubes 990, 1020, 1050, and 1070 are interconnected with the cathode resistor of the prime tube 970 through a conductor 975 and a pair of normally closed contacts 1066. Accordingly, the units dollars counting chain 905 functions in the same general manner as described above.

In response to the receipt of a positive pulse on the control electrode of the drive tube 960, the "0" manifesting tube 970 is extinguished and the "1" manifesting tube 990 is fired. Thereafter, the repeated application of pulses to the control electrode of the drive tube 960 sequentially fires the counting tubes 1020, 1050, and 1070 to manifest the value of the digit in the units dollars denominational column of the total charge to be assessed for a particular toll call.

The anodes of the counting tubes and the prime tube 970 are provided with conductors 971 which extend to the printing control circuit 235 through the cable 685. The anodes of these digit manifesting tubes are connected to like designated contacts in a particular stepping position of the switch 399.

Accordingly, the monetary portion of the cost computer 239, including the units cents counting ring 930, the tens cents counting ring 725, and the units dollars counting chain 905 provides a means for establishing a monetary charge to be assessed for a particular toll call in accordance with the minimum or base time interval of the call and for thereafter varying the established charge in accordance with the overtime portion of the duration of the call. Since the cost computer 239 is energized in parallel with the elapsed time counter 600, the cost computer 239 produces an electronic manifestation of a monetary charge to be assessed for a particular toll call at the same time that the elapsed time counter 600 is registering or determining the duration of this call.

The total charge to be assessed for a particular toll call is manifested in the monetary portion of the cost computer 239 by a single conductive tube in the units cents counting ring 900, the tens cents counting ring 725, and, perhaps, in the units dollars counting chain 905. This information is utilized by the printing control circuit 235 by using the current flow through the tubes selectively rendered conductive to operate control elements in the printer 236. When the information electronically manifested in the cost computer 239 is to be utilized by the printing control circuit 235, this circuit operates the relay 385 and also places ground on a conductor 1019 (FIG. 3) which extends to the cost computer 239 through the cable 368. This ground operates a first prepare-to-read relay 1010 so that a plurality of contacts 1011, 1012, 1013, and 1014 are closed and a plurality of contacts 1015, 1016, 1017, and 1018 are opened.

Closing the contacts 1011 grounds the biasing resistor 881 so that the positive biasing voltage is removed from the control electrode of the drive tube 880 in the units cents counting ring 900, thereby to prevent spurious pulses from producing a false indication in the units cents counting ring 900. The closure of the contacts 1012 grounds the tap on the potentiometer 981 through a resistance 981a so that the operating bias applied to the plurality of counting tubes in the base time counting chain 700, the units cents counting ring 900, the tens cents counting ring 725, and the units dollars counting chain 905 is reduced. By reducing the bias on these tubes it becomes difficult for these tubes to become ionized to give a false manifestation of the total cost in response to any spurious signals.

The closure of the contacts 1014 grounds the control electrodes of the drive tubes 720, 740, and 960 associated with the tens cents counting ring 725 and the units dollars counting chain 905 so that these tubes are rendered nonresponsive to pulses applied thereto, and, accordingly, prevents these tubes from being fired to produce a false indication in the counting chains controlled thereby. The opening of the contacts 1015, 1016, 1017, and 1018 disconnects the control electrodes of the counting tubes 910, 930, 950, and 980, respectively, from the anodes of the preceding tubes so that these tubes are disabled from operating.

The closure of the contact 1013 operates a second prepare-to-read relay 1040 to close a plurality of contacts 1041, 1042, 1043, and 1044. The closure of the contact 1042 grounds the conductor 975 so that the cathodes of the plurality of counting tubes forming the units dollars counting chain 905 are connected directly to ground, thereby bypassing the cathode resistor of the prime tube 970. By connecting the cathodes of these tubes directly to ground, it is possible for the current flow through the conductive tube in the chain 905 to exceed the value at which it was previously limited by the common cathode resistor, and this permits a heavier flow of current for use in controlling the operation of the printer 236. The closure of the contact 1043 connects the cathodes of the counting tubes 910, 930, 950, and 980 in the units cents counting ring 900 to ground and thereby bypasses the common cathode resistor 1019 so that a heavier current flow through the conductive one of these tubes for use by the printing control circuit 235 is possible. The closure of the contact 1044 bypasses the common cathode resistor 1045 and connects the commonly connected cathodes of the plurality of tubes forming the tens cents counting ring 725 directly to ground, so as to permit a greater flow of current through the conductive one of these tubes for use by the printing control circuit 235.

The closure of the contact 1041 completes an operating circuit for a third prepare-to-read relay 1030. This relay is thereby operated to close the pairs of contacts 1031 and 1032. The closure of the contacts 1032 interconnects the anodes of the tubes 980 and 930, which tubes manifest "5." The closure of the contacts 1031 interconnects the plates of the tubes 910 and 950, which tubes manifest "0." It is necessary to interconnect the plates of like designated tubes in the units cents counting ring 900 inasmuch as only one of the like designated tubes is conductive at any particular time. It is not possible to interconnect these tubes during the counting operation inasmuch as firing one of the tubes would produce a corresponding voltage drop at the anode of the other tube designated by the same digit.

Accordingly, in response to the operation of the three prepare-to-read relays 1010, 1030, and 1040, the cost computer 239 is conditioned for transmitting the information represented by the electronic manifestation of the digits comprising the toll charge to the printing control circuit 235. The operation of these prepare-to-read relays not only conditions the tubes selectively rendered conductive capable of carrying a greater current for use by the printing control circuit 235, but also grounds the control electrodes of the drive tubes and disconnects the control electrodes of the tubes in the units cents counting ring 900 so that no false indications can be produced in the plurality of counters 900, 725, and 905 in response to spurious signals.

*Resetting the Cost Computer 239*

The cost computer 239 includes a pair of relays 1060 and 1080 which are operated under the control of the printing control circuit 235 following the completion of the utilization of the information stored in the cost computer 239 representing the items of information pertaining to a particular toll call. The operation of the reset relay 1060 returns all of the tubes in the cost computer 239 to a nonconductive state, and the operation of the prime relay 1080 together with the release of the relay 1060 selectively operates the cost computer 239 in accordance with the rate information which is to be primed into this cost computer. This information consists of setting the base time counter 700 to a predetermined minimum base time period, and of setting the units cents counting ring 900 and the tens cents counting ring 725 to manifest a particular minimum base or initial charge which is to be assessed for each call completed to a particular exchange.

As described above, the length of the base time counter chain 700 is selectively adjusted in accordance with the base time period for which an initial charge is to be assessed. This base time period is established in accordance with the exchange to which a toll call is extended and is selectively controlled by the printing control circuit 235. The units cents counting ring 900 and the tens cents counting ring 725 are provided with information pertaining to the predetermined initial charge to be assessed for the base time period by selectively rendering two tubes conductive to electronically manifest the value of the digits in the units cents denominational column and the tens cents denominational column.

The reset relay 1060 is operated under the control of the printing control circuit 235 either at the end of each operation wherein a toll ticket is printed containing the items of information pertaining to a toll call or following the registration of items of information pertaining to an incomplete call by the operation of the reset relay 390 to close a pair of contacts 394. The closure of these contacts applies ground to a conductor 1057 which extends from the printing control circuit 235 to the cost computer 239 through the cable 368. In addition to operating the reset relay 1060, the printing control circuit 235 removes ground from the conductor 1019 so that the first prepare-to-read relay 1010 is released and, thereafter, the second and third prepare-to-read relays 1040 and 1030 are sequentially released. The release of the relay 1010 opens the contacts 1011, 1012, 1013, and 1014 and closes the contacts 1015, 1016, 1017, and 1018.

The opening of the contacts 1011 removes ground from the control electrode of the drive tube 880 so that this tube is rendered responsive to receive signals from the conductor 551 when the gate tube 850 is fired to provide a positive bias for this control electrode. The opening of the contacts 1012 removes the ground shunt from the potentiometer 981 so that a positive bias is reapplied to the control electrodes of the plurality of counting tubes in the cost computer 239. The opening of the contacts 1014 removes ground from the control electrodes of the drive tubes in the tens cents counting ring 725 and the units dollars counting chain 905 so that these drive tubes are again rendered responsive to receive signals. The closure of the contacts 1015 connects the control electrode of the tube 910 with the output anode of the tube 980, and the closure of the contacts 1016, 1017, and 1018 interconnects the control electrodes of the tubes 930, 950, and 980 with the anodes of the tubes 910, 930, and 950, respectively. Accordingly, the closure of the contacts 1015, 1016, 1017, and 1018 reconnects the counting tubes 910, 930, 950, and 980 into a closed counting ring so that the units cents counting ring 900 is conditioned for operation in response to the next series of effective pulses received at the control electrode of the drive tube 880.

The opening of the contacts 1013 removes the energization from the second prepare-to-read relay 1040 so that this relay releases to open the contacts 1041, 1042, 1043, and 1044. The opening of the contacts 1042 removes ground from the commonly connected cathodes of the counting tubes in the units dollars counting chain 905. The opening of the contacts 1043 removes direct ground from the commonly connected cathodes of the tubes forming the units cents counting ring 900. The opening of the contacts 1044 removes direct ground from the commonly connected cathodes of the counting tubes forming the tens cents counting ring 725. The opening of the contacts 1041 removes ground from the operating winding of the third prepare-to-read relay 1030.

The release of the third prepare-to-read relay 1030 opens the contacts 1031 and 1032 so that the anodes of the two "0" manifesting tubes 910 and 950 are disconnected and so that the anodes of the "5" manifesting tubes 930 and 980 are disconnected.

The reset relay 1060, which operates substantially simultaneously with the release of the first prepare-to-read relay 1010, opens a plurality of contacts 1062, 1063, 1064, 1065, and 1066 and closes a pair of contacts 1061. The opening of the contacts 3462 disconnects the prime tube 730 in the base time counting chain 700 from the commonly connected cathodes of the counting tubes in this counting chain so that the prime tube 730 may be rendered conductive without affecting the nonconductive state of the plurality of tubes forming the counting chain 700. Also, by opening the common cathode circuit formed by the conductor 731, the tube in the base time counting ring 700 which was selectively rendered conductive in response to the series of pulses on the conductor 551 representing the preceding toll call is extinguished inasmuch as the cathode circuit of the counting tube is now open. The base time counting chain 700 was not disabled in response to the sequential operation of the plurality of prepare-to-read relays 1010, 1030, and 1040 inasmuch as the electronic manifestation produced in this counting chain is not utilized in the printing control circuit 235.

The opening of the contacts 1063 disconnects the anode of the gate tube 850 from B+ voltage so that conduction through this tube is interrupted, thereby conditioning this tube for operation under the control of the base time counting chain 700.

The opening of the contacts 1064 disconnects the common cathode resistor for the counting tubes 910, 930, 950, and 980 in the units cents counting ring 900 from ground. Since the release of the second prepare-to-read relay 1040 has removed the ground shunt from around the cathode resistor 1019a, the cathodes of these tubes are completely disconnected from ground, thereby extinguishing the conductive tube in the ring 900. The opening of the contacts 1065 disconnects the common cathode resistor 1045 from ground and, since the release of the second prepare-to-read-relay 1040 has removed the ground shunt therefrom, the conductive tube in the counting ring 725 is extinguished.

The opening of the contacts 1966 disconnects the cathode resistor of the prime tube 970 from the plurality of counting tubes in the units dollars counting chain 705. The opening of the contacts 1066 and the substantially concurrent opening of the contacts 1042 disconnect the cathodes of the counting tubes 990, 1020, 1050, and 1070 from ground so that if one of these tubes is rendered conductive during the prior operation of the cost computer 239, this tube is extinguished to restore the units dollars counting chain 905 to a normal condition.

The closure of the contacts 1061 applies ground to the operating winding of the prime relay 1080 to operate this relay. The prime relay 1080, in operating, closes a plurality of contacts 1081, 1082, 1083, 1084, 1085, and 1086 and opens a pair of contacts 1087. The closure of the contacts 1081 applies a positive biasing voltage to the control electrode of the prime tube 730 in the base time counting chain 700 so that this tube is rendered conductive. The voltage transient produced by rendering the prime tube 730 conductive does not affect the nonconductive state of the remainder of the tubes in the base time counting chain 700 inasmuch as the cathode resistor of this tube is not connected to the commonly connected cathodes of these tubes.

The closure of the contacts 1082 applies a positive biasing voltage to the control electrode of the prime or "0" manifesting tube 970 in the units dollars counting chain 905. This application of a positive biasing voltage renders the tube 970 conductive. However, the voltage transient produced by the firing of the tube 970 does not affect the nonconductive state of the plurality of tubes forming the units dollars counting chain 905 inasmuch as the previous operation of the reset relay 1060 interrupts the connection between the cathode resistor of the prime tube 970 and the commonly connected cathodes of these remaining tubes.

The closure of the contacts 1083 and 1084 connects the conductors 1091 and 1092 to the control electrodes of the first "0" manifesting tube 910 and the first "5" manifesting tube 930 in the units cents counting ring 900, respectively. The conductors 1091 and 1092 extend to the printing control circuit 235 through the cable 368 and one of these conductors is selectively energized with a positive biasing voltage in accordance with the initial charge to be established in the cost computer 239. The application of a positive biasing voltage to either of these two conductors selectively conditions either the tube 910 or the tube 930 for being rendered conductive to manifest either "0" or "5" in the units cents denominational column of the initial charge to be assessed for a particular toll call.

The closure of the contacts 1085 and 1086 selectively interconnects a pair of conductors 781 and 786 with a pair of conductors 1093 and 1094, respectively, which extend to the printing control circuit 235 through the cable 368. The conductor 781 is connected to the control electrode of the "1" manifesting tube 780 in the tens cents counting ring 725, and the conductor 786 is connected to the control electrode of the "2" manifesting tube 785 in this same counting ring. One of the conductors 1093 or 1094 is provided with a positive biasing voltage under the control of the printing control circuit 235 in accordance with the initial charge to be assessed for a toll call having a base time period equal to the time set in the base time counting circuit 700. If the minimum charge to be assessed includes the digit "1" in the tens cents denominational column, the conductor 1093 is provided with positive bias, and this bias is applied through the conductor 781 to the control electrode of the "1" manifesting tube 780 to condition this tube for being rendered conductive. However, if the initial charge to be assessed for a toll call having the duration equal to the minimum time set in the base time counter 700 includes the digit "2" in the tens cents denominational column, the printing control circuit 235 applies a positive biasing voltage to the conductor 1094, and this positive bias is applied through the closed contacts 1086 and the conductor 786 to the control electrode of the "2" manifesting tube 785 in the tens cents counting ring 725.

The opening of the contacts 1087 removes ground from a conductor 1095 which extends to the printing control circuit 235 through the cable 368. The removal of ground from the conductor 1095 releases a relay (not shown) in the printing control circuit 235 to prevent the magnetic tape 300 in the seized trunk recorder 125 from being advanced until the conditioning or priming of the cost computer 239 has been completed.

After the resetting of the storage chain 238, ground is removed from the operating winding of the reset relay 1060 under the control of the printing control circuit 235 by the release of the relay 390 to open the contacts 394. The removal of ground from the conductor 1067 releases the relay 1060 so that the contacts 1062, 1063, 1064, 1065, and 1066 are closed and the contacts 1061 are opened. The closure of the contacts 1062 completes the connection through the conductor 731 between the cathode resistor of the prime tube 730 and the plurality of counting tubes in the base time counting chain 700. The closure of the contacts 1063 reestablishes the connection between the anode of the gate tube 850 and the source of positive potential so that this gate tube is now conditioned for operation. Accordingly, the closure of the contacts 1062 and 1063 conditions the base time counting chain 700 for operation in accordance with the next group of pulses representing the duration of the succeeding toll call, and also conditions the gate tube 850 for operation in response to the receipt of a group of pulses equal in number to the base time interval assigned to calls extending to a particular exchange.

The closure of the contacts 1064 connects the common cathode resistor 1019a to ground so that either the "0" manifesting tube 910 or the "5" manifesting tube 930 in the units cents counting ring 900 is rendered conductive in accordance with the selective application of a positive biasing voltage to the control electrode thereof under the control of the printing control circuit 235.

The closure of the contacts 1064 grounds the cathode resistor 1045, which is common to all of the tubes in the tens cents counting ring 725, so that either the tube 780 or the tube 785 is fired in accordance with the selective application of the positive biasing voltage to the control electrode thereof through either of the conductors 781 or 786. In addition to selectively rendering conductive the conditioned tube, the grounding of the common cathode resistor 1045 renders the tens cents counting ring 725 effective for operation under the control of the units cents counting ring 900 in response to the receipt of the group of pulses representing the duration of the next toll call.

The closure of the contacts 1066 establishes the connection through the conductor 975 so that the cathode resistor of the "0" manifesting tube 970 is connected to the commonly connected cathodes of the plurality of counting tubes forming the units dollars counting chain 905. Accordingly, this chain is now conditioned for sequential operation under the control of the tens cents counting ring 725.

The opening of the contacts 1061 breaks the energizing circuit for the prime relay 1080 so that this relay releases to open the contacts 1081, 1082, 1083, 1084, 1085, and 1086 and to close the contacts 1087. The opening of the contacts 1081 removes the positive bias from the prime tube 730 in the base time counter 700, which tube is now conducting. The opening of the contacts 1083 removes the positive bias from the "0" manifesting tube 970 in the units dollars counting chain 905, which tube is also conducting.

The opening of the contacts 1083 and 1084 removes the positive bias from the control electrodes of the "0" manifesting tube 910 and the "5" manifesting tube 930 in the units cents counting ring 3300. One of these tubes is now conducting inasmuch as the prior closure of the contacts 1064 completed the cathode circuit for these tubes. The opening of the contacts 1085 and 1086 removes the positive bias from the control electrodes of the "1" manifesting tube 780 and the "2" manifesting tube 785 in the tens cents counting ring 725. One of these tubes is now conducting inasmuch as the prior closure of the contacts 1065 completed the cathode circuit for these tubes.

The closure of the contacts 1087 applies ground through the conductor 1095 and the cable 368 to the relay (not shown) previously released in the printing control circuit 235, thereby to operate this relay. The operation of this relay in the printing control circuit 235 instructs the seized trunk recorder 125 that the resetting operation in the cost computer 239 has been completed, and that therefore the magnetic tape 300 in the seized recorder 125 may be advanced to playback the plurality of items of information pertaining to the next toll call.

Accordingly, in the resetting operation, the operation of the reset relay 1060 together with the release of the prepare-to-read relays 1010, 1030, and 1040 opens the conductive path through any of the conducting tubes in the cost computer 239 to remove any electronic manifestation therein of items of information pertaining to the toll call for which a printed ticket has been produced. The operation and release of these relays also prepare the base time counting chain 700, the units cents counting ring 900, the tens cents counting ring 725, and the units dollars counting chain 905 for a succeeding cycle of operation. The operation of the prime relay 1080 under the control of the reset relay 1060 renders the prime tube 730 in the base time counting chain 700 and the prime or "0" manifesting tube 970 in the units dollars counting chain 905 conductive. The operation of the prime relay 1080 also places a positive biasing potential on the control electrodes on certain of the counting tubes in the units cents counting ring 900 and the tens cents counting ring 725 so that these tubes will be selectively rendered conductive in response to the release of the reset relay 1060. The subsequent release of the reset relay 1060 interconnects the cathode resistors of the prime tubes 730 and 970 in the base time counting chain 700 and the units dollars counting chain 905 with the commonly connected cathodes of the counting tubes therein, thereby to condition these circuits for operation under the control of the items of information representing the duration of the next succeeding toll call. The release of the reset relay 1060 also grounds the common cathode resistor in the units cents counting ring 900 and the tens cents counting ring 725 so that the primed tubes therein are rendered conductive to electronically manifest the predetermined initial charge to be assessed for the next succeeding toll call.

The release of the reset relay releases the prime relay 1080 so that the positive bias is removed from the plurality of control electrodes in the units cents counting ring 900, the tens cents counting ring 725, the base time counter 700, and the units dollars counting chain 905. Also, the release of the prime relay 1080 reoperates a relay in the printing control circuit 235, thereby indicating to this circuit that the priming and resetting operation in the cost computer 239 has been completed.

*Operation of the Elapsed Time Counter 600 and the Cost Computer 239*

To illustrate the operation of the elapsed time counter 600 and the cost computer 239 in accordance with information stored on the magnetic tape 300 in the trunk recorder 125, it is assumed that included in the data pertaining to the first call stored in the trunk recorder 125 is a group of twenty-six mark pulses representing a call duration of approximately twenty-six minutes. The trunk recorder 125 is seized incident to a playback or readout operation by the playback control circuit 230, as described in detail hereinabove, so that the wiper 231d operates the first destination or rate relay 360 to indicate to the printing control circuit 235 that a trunk recorder has been seized in which is stored data pertaining to calls extended between the officers 107 and 108. The operation of the first destination or rate relay 360 closes the contacts 361, 362, and 363.

The closure of the contacts 361 applies ground to the conductor 793 to complete the operating circuit for the three-minute relay 790 in the base time counter 700 of the cost computer 239. In operating, the relay 790 closes the contacts 791 to connect the control electrode of the gate tube 850 to the anode of the counting tube 770. The opening of the contacts 792 renders the tubes 800 and 830 in the base time counter 700 ineffective to control the operation of the gate tube 850. Accordingly, in response to the operation of the rate or destination relay 360, the cost computer 239 is provided with information indicating that the base time period for which an initial charge is to be assessed is three minutes.

The closure of the contacts 362 and 363 primes the initial charge which is to be assessed for this base time period into the cost computer 239. More specifically, the closure of the contacts 362 applies B+ potential to the conductor 1091 which extends through the cable 368 to the open contacts 1083 controlled by the prime relay 1080 in the cost computer. The application of B+ potential to the conductor 1091 indicates that the units cents digit of the initial charge is "0." The closure of the contacts 363 applies B+ potential to the conductor 1093 which is extended over the cable 368 to the normally opened contacts 1085, which are also controlled by the prime relay 1080. The application of B+ potential to the conductor 1093 indicates that the value of the tens cents digit of the initial charge to be assessed is "1."

Incident to the seizure of the trunk circuit 119 and its associated trunk recorder 125 by the playback control circuit 230 and the printing control circuit 235, a relay 380 is operated to close a pair of contacts 381 so that ground is forwarded over the wiper 231c to operate the clutch magnet 328, thereby displacing the detent portion 330a of the armature 330 to permit the idler 339 to be moved into driving engagement with the roller 326 and the wheel 322. This initiates continuous movement of the magnetic tape 300. The first item of information stored on the tape 300 is an end-of-call code comprising simultaneous mark and space pulses which, when transmitted through the amplifiers 232, 233, 233a, and 234 to the printing control circuit 235, causes the operation of the reset relay 390 therein so that the contacts 391 and 392 are opened and the contacts 393 and 394 are closed. The opening of the contacts 391 and 392 disconnects the cathodes of the counting tubes in the units minutes counting ring 500 and the tens minutes counting chain 400 from ground so that any conductive tubes therein are extinguished. The closure of the contacts 393 applies B+ potential to the conductor 461 which is connected to the control electrodes of the "0" manifesting tubes 420 and 560 in the counting chain 400 and the counting ring 500, thereby priming these tubes to a conductive condition representing an elapsed time of "00" minutes.

The closure of the contacts 394 applies ground to the conductor 1067 to operate the reset relay 1060 in the cost computer 239. The operation of this relay removes ground from the counting tubes in the counting chains and rings in the cost computer 239, thereby to remove any manifestations provided therein, and the operation of the reset relay 1060 further completes an operating circuit for the prime relay 1080 so that this relay operates to close the contacts controlled thereby. The closure of the contacts 1081 applies a priming potential to the control electrode of the "0" manifesting tube 730 in the base time counter 700, thereby placing this tube in a conductive condition representing an elapsed time of "0" minutes. The closure of the contacts 1082 applies B+ potential to the control electrode of the "0" manifesting tube 910 in the units cents counter 900 and to the control ate this counter to a condition representing "0" dollars. The closure of the contacts 1083 and 1085 extends B+ potential to the control electrode of the "0" manifesting tube 910 in the units cents counter 900 and to the control electrode of the "1" manifesting tube 780 in the tens cents counter 725. The opening of the contacts 1087 actuates the printing control circuit 235 to insure that the relay 380 is not reoperated during the resetting and priming of the cost computer 239.

Upon completion of the resetting operation, the printing control circuit 235 releases the reset relay 390 to restore the contacts controlled thereby to their normal conditions. The closure of the contacts 391 and 392 renders the counting chain 400 and the counting ring 500 in the elapsed time counter 600 responsive to applied pulses, and the opening of the contacts 393 removes the priming potential from the control electrodes of the "0" manifesting tubes 420 and 560. The opening of the contacts 394 releases the reset relay 1060 so that the contacts controlled thereby are restored to their normal conditions. Restoring these contacts provides cathode ground for the tubes in the counting chains and rings in the cost computer 239 so that the tubes 910 and 780 in the units cents counter 900 and the tens cents counter 725, respectively, are rendered conductive under the control of the priming potentials previously forwarded to their control electrodes, thereby to provide a manifestation of an initial charge of ten cents in the cost computer 239, which initial charge is to be assessed for the base time interval of three minutes primed into the base time counter 700. The release of the reset relay 1060 further opens the operating circuit for the prime relay 1080 so that this releay releases to remove the priming potentials described above and, in closing the contacts 1087, to advise the printing control circuit 235 that the resetting and priming operation has been completed so that the items of information stored on the magnetic tape 300 in the trunk recorder 125 pertaining to the first toll call can now be transmitted to the storage chains 238, the elapsed time counter 600, and the cost computer 239.

The relay 380 in the printing circuit 235 is again operated to close the contacts 381 so that the magnetic tape 300 is advanced. This advance of the tape 300 induces mark and space pulse voltages in the transducing heads 302 and 304 which are coupled through the amplifiers 232, 233, 233a, and 234 to the steering circuit 237 and the common mark pulse conductor 354. The items of information relating to the identification of the calling and called subscribers are stored in selected ones of the storage chains 238, and the steering circuit 237 is sequentially advanced to control the entry of this information into the various storage chains. When the space pulse immediately preceding the group of twenty-six mark pulses representing the duration of the toll call is applied to the steering circuit 237, a positive enabling potential is supplied to the conductor 237a so that an enabling bias is provided at the control electrode of the drive tube 550 in the units minutes counting ring 500 of the elapsed time counter 600. This enabling bias permits simultaneous operation of the elapsed time counter 600 to establish the duration of the call and of the cost computer 239 to establish the monetary charge to be assessed for the call.

More specifically, following the application of the positive enabling potential to the conductor 237, the group of twenty-six mark pulses applied to the common mark pulse conductor 354 representing the duration of the first toll call intermittently fire the drive tube 550 so that the units minutes counting ring 500 is sequentially advanced through two complete cycles of operation and then advanced to a point at which the "6" manifesting tube 650 is rendered conductive to manifest the value of the units minutes digit "6" of elapsed time. Incident to the two complete cycles of operation of the units minutes counting ring 500, two positive pulses are applied to the drive tube 410 in the tens minutes counting chain 400, thereby sequentially extinguishing the tubes 420 and 430 and firing the "2" manifesting tube 440 therein. The conductive condition of the tube 440 represents a tens minutes digit of "2" which, when considered in conjunction with the conductive tube 650 in the units minutes counting ring 500, provides a total elapsed time manifestation in the counter 600 of "26" minutes.

In addition to operating the elapsed time counter 600, the group of twenty-six mark pulses representing the duration of the toll call operates the cost computer 239. More specifically, each time that the drive tube 550 in the units minutes counting ring 500 is operated, a positive pulse is coupled over the conductor 551 to the control electrode of the drive tube 710 in the base time counter 700. The first three pulses applied thereto sequentially advance the counter 700 so that at the end of the third pulse only the "3" minute manifesting tube 770 is in a conductive condition. As set forth above, during the recording of duration information on the magnetic tape, it is possible for the first duration pulse to be recorded thereon after an elapsed time of merely a few seconds and, in order to prevent the subscriber from being charged for a full one-minute increment of elapsed time, the gate tube 850 in the cost computed 239 is not fired to render the units cents counter 900 responsive to duration impulses until four mark pulses defining a full three-minute base time increment have been received by the base time counter 700. Accordingly, when the fourth mark pulse is supplied from the amplifiers 233 and 233a, the "3" minute manifesting tube 770 is extinguished to supply a positive pulse through a coupling condenser to the control electrode of the tube 850, thereby firing this tube to provide a positive enabling potential across the resistor 881 for the control electrode of the drive tube 880 in the units cents counter 900.

When the fifth pulse in the group is applied to the drive tube 550 in the units minutes counting ring 500, the drive tube 880 is rendered conductive to extinguish the "0" manifesting tube 910 in the units cents counter 900, which was primed to a conductive condition as described above. Extinguishing the "0" manifesting tube 910 fires the "5" manifesting tube 930. When the sixth pulse is applied, the "5" manifesting tube 930 is extinguished and the "0" manifesting tube 950 is fired. Extinguishing the "5" manifesting tube 930 provides a positive pulse which is coupled to the control electrode of the drive tube 720 in the cost computer 239, thereby extinguishing the "1" manifesting tube 780 therein, which was primed into a conductive condition as described above. Extinguishing the tube 780 provides a positive pulse which fires the "2" manifesting tube 785 in the tens cents counter 725. Accordingly, the application of two mark pulses following the subtraction of the base time interval from the group of mark pulses pertaining to the duration of the call adds a ten cent increment to the initial charge primed into the cost computer 239 by advancing the tens cents counter 725 to a condition representing a tens cents digit "2" and by advancing the units cents counter 900 to a condition representing a units cents digit "0."

Thereafter, the remaining twenty mark pulses are supplied to the cost computer 239 to advance the counter 900 to a condition in which the "0" manifesting tube 950 is in a conductive condition, to advance the tens cents counter 725 to a condition in which the "2" manifesting tube 785 is in a conductive condition, and to advance the units dollars counter 905 in a condition in which the "1" manifesting tube 990 is in a conductive condition. Considered jointly, these tubes provide a manifestation of a total charge of one dollar and twenty cents which is to be assessed for the toll call. This represents the initial charge of ten cents which is to be assessed for the base time period of three minutes represented by the first four mark pulses on the tape 300 and an overtime charge of one dollar and ten cents which is to be assessed at the rate of five cents for each one minute of overtime represented by the remaining twenty-two pulses in the group.

The transmission of the space pulse on the magnetic tape 300 immediately following the duration pulses to the steering circuit 237 removes the positive potential from the conductor 237a to render the elapsed time counter 600 and the cost computer 239 nonresponsive to additional mark pulses appearing on the common mark pulse conductor 354. Thereafter, the steering circuit 237 renders additional ones of the storage chains 238 effective to receive the remaining data pertaining to the first toll call.

Upon the completion of the storage of all of the items of information pertaining to the first toll call, an end-of-call code is transmitted to the printing control circuit 235 to cause the release of the relay 380 and, accordingly, to arrest movement of the magnetic tape 300 in the trunk recorder 125. Incident to the termination of the transmission of the stored toll call data, the printing control circuit operates the prepare-to-read relays 385 and 395. The operation of the relay 385, in closing the contacts 386 and 387, reduces the normal potential provided by the voltage divider 383, thereby to reduce the sensitivity of the plurality of storage chains 238, including the tens minutes counting chain 400 and the units minutes counting ring 500, to spurious pulses which may be provided incident to the readout operation. In closing the contacts 396 and 397, upon operation of the second prepare-to-read relay 395, direct ground is connected to the cathode of the conductive "2" manifesting tube 440 in the tens minutes counting chain 400 and the cathode of the "6" manifesting tube 650 in the units minutes counting ring 500, thereby to condition these tubes for carrying an increased current sufficient to control the operation of the printer 236. The closure of the contacts 387 applies ground to the control electrode of the drive tube 410 in the tens minutes counting chain 400, thereby to prevent inadvertent operation thereof.

Concurrently with operating the prepare-to-read relays in the printing control circuit 235, ground is supplied to the conductor 1019 to cause the sequential operation of the first, second, and third prepare-to-read relays 1010, 1040, 1030 in the cost computer 239. As described above, the sequential operation of these relays renders the counting chains and rings forming the cost computer 239 relatively insensitive to spurious signals to prevent a change in the monetary cost or charge manifestation provided thereby, and the operation of these relays further connects direct ground to the cathodes of the conductive tubes 950, 785, and 990 to condition these tubes for carrying an increased flow of current sufficient to control the operation of the printer 236.

Following the completion of the prepare-to-read operations, the printing control circuit 235 initiates step-by-step operation of the switch 399 so that the ten wipers thereof are sequentially advanced over their associated contact banks. In each of the stepping positions of the switch 399, these wipers are connected to the anodes of the tubes comprising a single one of the counting or storage chains 238 so that a decoding relay circuit (not shown) is selectively operated in accordance with the conductive one of the tubes in each of these storage chains to establish controlling conditions for the printer 236 so that a printed record of the data stored in each of the storage chains 238 is provided. When the stepping switch 399 moves to a position in which the elapsed time data is to be printed, the conductors 491 and 511 connected to the anodes of the tubes in the tens minutes counting chain 400 are connected to the decoding relay circuit so that the printer 236 is actuated to print the tens minutes digit "2." Thereafter, the stepping switch 399 advances to release the tens minutes counting chain 400 and to seize the units minutes counting ring 500 so that the conductive tube 650 operates the printer 236 to record a units minutes digit "6" immediately adjacent the previously recorded tens minutes digit "2."

In a similar manner, the switch 399 advances to sequentially interconnect the units dollars counter 905, the tens cents counter 725, and the units cents counters 900 with the decoding relay circuit so that the printer 236 sequentially operates to record "1.20" on the record medium. In order to provide punctuation and certain desired control functions, such as carriage return and line space, certain positions of the stepping switch 399 provide prewired control information of this nature.

Following the completion of the printing operation, the prepare-to-read relays 395 and 385 in the printing control circuit 235 are released, thereby causing the accompanying release of the prepare-to-read relays 1010, 1040, and 1030 in the cost computer 239. Following the release of the prepare-to-read relays, the reset relay 390 is again operated, as described above, to cause the sequential operation of the reset relay 1060 and the prime relay 1080 in the cost computer 239. The sequential operation of the relays 390, 1060, and 1080 clears the elapsed time counter 600 and the cost computer 239 of the previous manifestations provided thereby in addition to clearing the remainder of the storage chains 238. Following the resetting operation, the prime relay 1080 primes the initial charge into the units cents counter 900 and the tens cents counter 725, as described above. It should be noted that since the three-minute base time relay 790 in the base time counter 700 is operated by direct ground provided at the closed contacts 361 at the first destination or rate relay 360, this relay remains operated during the resetting operations and for as long as the playback control circuit 230 maintains its connection with the trunk circuit 119 and the trunk recorder 125.

This type of intermittent operation continues until such time as all of the data stored on the magnetic tape 300 in the trunk recorder 125 has been played back to the storage facilities and the printer 236. Following the completion of this playback of the trunk recorder 125, the stepping switch 231 is stepped to seize all of the remaining trunk recorders to playback the items of information stored therein. Incident to advancing from a position in which the trunk circuit 119 is seized, the wiper 231d interrupts the operating circuit for the first destination or rate relay 360 so that this relay releases to remove the base time and initial charge information which is provided to the cost computer 239. The wiper then causes the operation of a selected one of the relays 360 and 370 in accordance with the exchange between which the calls whose information is stored in the next seized trunk recorder are extended. As indicated schematically in FIG. 3 of the drawings, if the next trunk recorder and its associated trunk circuit are in an idle condition, the wiper 231d would next operate the destination or rate relay 370 to provide the base time and initial charge information set forth in detail above. Moving the wiper 231d releases the relay 340 in the trunk circuit 119 so that control over the trunk recorder 125 is returned to the data collecting and storing circuits.

In summary, therefore, the telephone system of the present invention includes new and improved computing means for quickly establishing toll charges in a monetary form which are to be assessed for toll calls. This calculating means, which largely consists of electronic components capable of operation at high speeds, requires a minimum of installation space in a telephone office and is readily adaptable to receive and utilize various types of entered rate and duration factors in addition to those illustrated in FIGS. 3-10. Further, it should be understood that, although the improved computing means of the present invention is shown and described in conjunction with a particular type of automatic telephone system, these computing means are of general utility and capable of use in conjunction with many varying types of means of collecting and storing data. The illustrated embodiment of the invention merely sets forth and demonstrates the broad principles of the present invention within which many modifications can be devised by those skilled in the art.

What is claimed as new and desired to be secured by Letters Patent of the United States is:

1. In a computing device for determining the total charge for a variable number of units, wherein there is a first given charge for any number of units up to a predetermined number of base units and a second given charge for each unit in excess of said predetermined number of base units, said device comprising register means for storing said variable number of units as a series of signals equal in number to the number of units stored, normally closed gating means, a normally enabled base unit counter, a charge counter, means for priming said charge counter to a count manifesting said first given charge, means coupled between said register and said base unit counter for sequentially advancing the count of said base unit counter in response to each stored unit, means coupling said base unit counter to said gating means for opening said gating means in response to the count of said base unit counter having been advanced by said predetermined number of stored units and for disabling said base unit counter in response to the opening of said gating means, and means including said gating means coupled to said charge counter and said register for sequentially advancing the count of said charge counter by an amount equal to said second given charge only when said gating means is opened in response to each stored unit in excess of said predetermined number of base units.

2. The computing device defined in claim 1, further including recording means coupled to said register and said charge counter for recording the total charge manifested by said charge counter in response to said base unit counter and said charge counter having been advanced by all said stored units.

3. The computing device defined in claim 2, wherein said recording means includes reset means coupled to said base unit counter and said charge counter for resetting said counters after said total charge has been recorded.

4. The computing device defined in claim 1, wherein said charge counter comprises at least a first counter and a second counter, each count of said second counter manifesting a charge which is a given plural integral multiple of the charge manifested by each count of said first counter, said first counter being a chain counter including greater than said given plural integral multiple of counting stages, the count capacity of said first counter being equal to the number of counting stages thereof, means interconnecting said first and second counters for advancing said second counter by one count when said first counter is advanced by said given integral multiple of counts, and said recording means including coupling means for coupling to each stage of said first counter to record a first component of said total charge in accordance with the count of said first counter, said recording means including means for recording the same particular value of said first component in response to said first counter having a first particular count not exceeding said plural integral number and in response to said first counter having a second particular count exceeding said plural integral number.

5. The computer defined in claim 4, wherein said first counter is a ring-connected counter.

6. The computing device defined in claim 1, further including means coupled to said gating means and said base unit counter for altering said predetermined number of base units between a given maximum number and a given number below said given maximum number.

7. In combination, a first counter, a second counter, means interconnecting said second counter to said first counter to advance said second counter one count each time said first counter is advanced a plural integral number of counts, said first counter being a chain counter including a greater number of counting stages than said plural integral number, the count capacity of said first counter being equal to said number of counting stages thereof, means for advancing the count of said first counter in accordance with the value of a variable-valued signal, recording means coupled to said counters for making a record of the value of said variable-valued signal in accordance with the counts to which said first and second counters have been advanced, said recording means including coupling means for coupling to each stage of said first counter to record a first portion of the value of said signal in accordance with the count of said first counter, said recording means including means for recording the same particular value of said first portion in response to said first counter having a first particular count not exceeding said plural integral number and in response to said first counter having a second particular count exceeding said plural integral number.

References Cited in the file of this patent
UNITED STATES PATENTS

| | | |
|---|---|---|
| 2,253,596 | Wright | Aug. 26, 1941 |
| 2,404,654 | Potts | July 23, 1946 |
| 2,531,622 | Hague et al. | Nov. 28, 1950 |
| 2,594,731 | Connolly | Apr. 29, 1952 |
| 2,596,308 | Ungar | May 13, 1952 |
| 2,692,551 | Potter | Oct. 26, 1954 |
| 2,724,741 | Lomax | Nov. 22, 1955 |
| 2,749,386 | Wright | June 5, 1956 |
| 2,761,621 | Wright et al. | Sept. 4, 1956 |
| 2,767,246 | Retallack | Oct. 16, 1956 |
| 2,780,408 | Crossman et al. | Feb. 5, 1957 |
| 2,865,563 | Wright et al. | Dec. 23, 1958 |

UNITED STATES PATENT OFFICE
CERTIFICATE OF CORRECTION

Patent No. 3,164,677                      January 5, 1965

Frank A. Morris et al.

It is hereby certified that error appears in the above numbered patent requiring correction and that the said Letters Patent should read as corrected below.

Column 8, line 19, for "plyback" read -- playback --; column 10, line 21, for "circuits" read -- circuit --; column 33, line 9, for "tube 910 in the units cents counter 900 and to the control" read -- tube 970 in the units dollars counter 905 thereby to oper- --.

Signed and sealed this 20th day of July 1965.

(SEAL)
Attest:

ERNEST W. SWIDER
Attesting Officer

EDWARD J. BRENNER
Commissioner of Patents